(12) United States Patent
Cox et al.

(10) Patent No.: US 8,658,962 B2
(45) Date of Patent: *Feb. 25, 2014

(54) OPTICAL SWITCH WITH GLOWABLE ACTIVATOR PORTION

(71) Applicants: Christopher E. Cox, Baton Rouge, LA (US); Raleigh L. Cox, Baton Rouge, LA (US)

(72) Inventors: Christopher E. Cox, Baton Rouge, LA (US); Raleigh L. Cox, Baton Rouge, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/706,566

(22) Filed: Dec. 6, 2012

(65) Prior Publication Data
US 2013/0121637 A1 May 16, 2013

Related U.S. Application Data

(63) Continuation of application No. 12/576,894, filed on Oct. 9, 2009, now Pat. No. 8,334,501.

(60) Provisional application No. 61/106,097, filed on Oct. 16, 2008.

(51) Int. Cl.
*G06M 7/00* (2006.01)
*G01N 21/49* (2006.01)

(52) U.S. Cl.
USPC .......................................... 250/221; 250/577

(58) Field of Classification Search
USPC ............ 250/573, 577, 214 SW, 221, 227.11, 250/227.15, 900–908, 551, 227.22; 340/618, 619, 623–625; 73/61.02, 73/61.04, 61.11, 61.1
See application file for complete search history.

(56) References Cited

U.S. PATENT DOCUMENTS

| | | |
|---|---|---|
| 3,082,400 A | 3/1963 | Coop |
| 3,120,125 A | 2/1964 | Vasal |
| 3,863,067 A | 1/1975 | Gooley |
| 4,051,723 A | 10/1977 | Head et al. |
| 4,064,754 A | 12/1977 | Frey |
| 4,091,671 A | 5/1978 | McLees |
| 4,156,149 A | 5/1979 | Vaccari |
| 4,519,257 A | 5/1985 | Simpkins |

(Continued)

FOREIGN PATENT DOCUMENTS

| | | |
|---|---|---|
| EP | 0354169 A1 | 2/1990 |
| JP | 56138505 A | 10/1981 |

(Continued)

OTHER PUBLICATIONS

Corning, Corning ClearCurve Optical Fiber, 4-Page Brochure printed from www.corning.com/clearcurve website, copyright 2008, Corning Incorporated.

(Continued)

*Primary Examiner* — Que T Le
*Assistant Examiner* — Jennifer Bennett
(74) *Attorney, Agent, or Firm* — Jones Walker LLP

(57) ABSTRACT

An optical switch having a housing, a light source and a light detector. The light source and light detector are located remote from the housing. The light source is connected to the housing with a first light guide, and the light detector is connected to the housing with a second light guide. The first and second light guide cables have distal ends positioned through the housing and a part of the activator housing is a glowable diffuse reflector. The switch includes a moveable member that moves in a path in the switch body between an optical path present state and an optical path absent state.

21 Claims, 26 Drawing Sheets

(56) References Cited

U.S. PATENT DOCUMENTS

| | | | |
|---|---|---|---|
| 4,629,841 | A | 12/1986 | Riback et al. |
| 4,773,265 | A | 9/1988 | Baillie et al. |
| 4,836,632 | A | 6/1989 | Bardoorian |
| 4,856,874 | A | 8/1989 | Tusting |
| 4,938,590 | A | 7/1990 | Ishida |
| 5,017,748 | A | 5/1991 | Sapiro |
| 5,072,617 | A | 12/1991 | Weiss |
| 5,105,663 | A | 4/1992 | Kuhlen |
| 5,124,686 | A | 6/1992 | White et al. |
| 5,130,535 | A | 7/1992 | Kummer et al. |
| 5,133,030 | A | 7/1992 | Lee |
| 5,175,780 | A | 12/1992 | Sano et al. |
| 5,373,153 | A | 12/1994 | Cumberledge et al. |
| 5,585,786 | A | 12/1996 | Clark et al. |
| 5,684,296 | A | 11/1997 | Hamblin et al. |
| 5,743,135 | A | 4/1998 | Sayka et al. |
| 5,874,899 | A | 2/1999 | Barmore et al. |
| 5,917,180 | A | 6/1999 | Reimer et al. |
| 5,950,487 | A | 9/1999 | Maresca et al. |
| 6,125,218 | A | 9/2000 | Humphrey |
| 6,218,949 | B1 | 4/2001 | Issachar |
| 6,256,430 | B1 | 7/2001 | Jin et al. |
| 6,555,837 | B2 | 4/2003 | Benton |
| 6,650,820 | B2 | 11/2003 | Ross et al. |
| 6,727,822 | B2 | 4/2004 | Chamberlin et al. |
| 6,832,035 | B1 | 12/2004 | Daoud et al. |
| 7,234,830 | B1 | 6/2007 | Cox et al. |
| 7,272,289 | B2 | 9/2007 | Bickham et al. |
| 7,444,042 | B1 | 10/2008 | Niblock et al. |
| 7,714,732 | B2 | 5/2010 | Cox et al. |
| 7,772,538 | B2 | 8/2010 | Cox et al. |
| 7,894,702 | B2 | 2/2011 | Ogasawara et al. |
| 7,902,989 | B2 | 3/2011 | Cox et al. |
| 8,314,711 | B2 | 11/2012 | Cox et al. |
| 8,334,501 | B1 | 12/2012 | Cox et al. |
| 2006/0139177 | A1 | 6/2006 | Gomery |

FOREIGN PATENT DOCUMENTS

| | | | |
|---|---|---|---|
| JP | 357042817 | A | 3/1982 |
| JP | 07218847 | A | 8/1995 |
| JP | 07218847 | A2 | 8/1995 |
| WO | 03102515 | A1 | 12/2003 |
| WO | 2008147415 | A1 | 12/2008 |
| WO | 2010011942 | A1 | 1/2010 |
| WO | 2010093929 | A1 | 8/2010 |

OTHER PUBLICATIONS

Accuflect, Light Reflecting Ceramic, 4-page brochure printed from accuratus.com/accuflprods website, Copyright Accuratus.

Reflectance Characteristics of Accuflect Light Reflecting Ceramic; pp. 1-11, Jul. 2010, Accuratus Ceramic Corporation.

PCT, International Searching Authority, PCT/US2012/069866, Search Report dated Feb. 19, 2013.

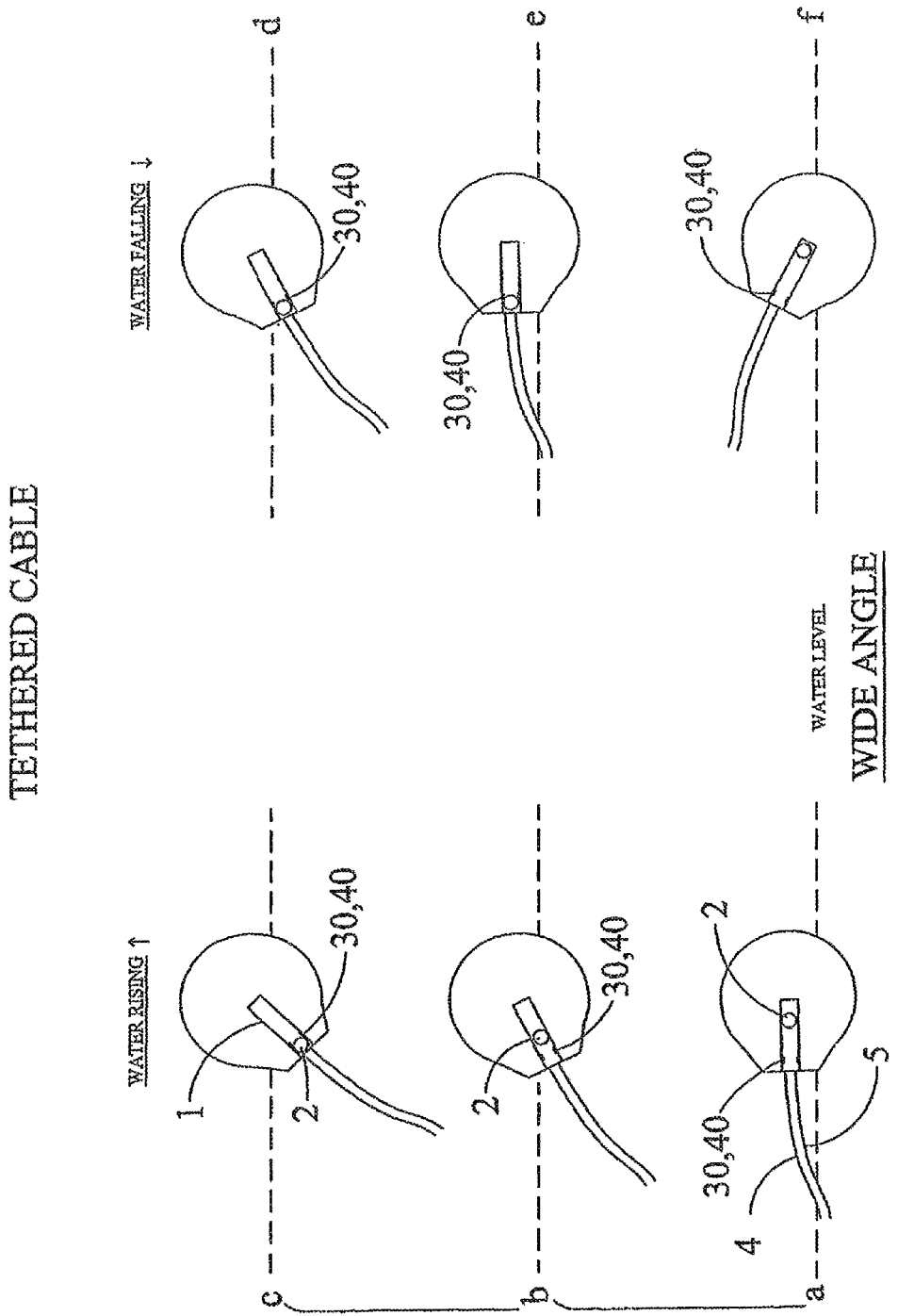

OPTICAL SWITCH WITH GLOWABLE ACTIVATOR PORTION

PRIORITY

This application is a continuation of U.S. patent application Ser. No. 12/576,894 filed on Oct. 9, 2009, which application claims the priority benefit of U.S. provisional application No. 61/106,097, filed on Oct. 16, 2008, and this application claims priority thereto and the contents of which are hereby incorporated by reference.

FIELD OF INVENTION

The invention relates to an optical switch activator, and more particularly to an optical switch activator where the light guides are positioned on the same side of the activator housing.

BACKGROUND OF THE INVENTION

The inventors have developed an optical switch/switch activator for use in hazardous and non-hazardous environments, and more particularly to a float activated optical switch, where the switch activator is an obstacle that can interrupt a beam of light (or pass a beam of light, depending on the orientation of the activator in the float body). See U.S. Pat. No. 7,234,830, hereby incorporated by reference. Improvements to the base optical device are contained in PCT/US2007/70122, filed May 31, 2007, hereby incorporated by reference.

The earlier inventions included two light guides (such as fiber optic cables), one connected to a source of light, the other connected to a light detector. Each light guide has a distal end positioned in an activator, where the two distal ends are separated by a gap but can be optically aligned. An optically opaque means to interrupt the beam of light is positioned in the gap, and in one position, blocks the light path (optical path absent) and in another position, does not obstruct the light path (optical path present). Hence the device operates as a switch upon detection of the presence or absence of light by the light receiver. As disclosed in the PCT/US2007/70122 application, one embodiment has the means to interrupt (such as a rollable ball, or slidable cylinder or slug) positioned in an ampoule containing a fluid to reduce "switch flutter." As also disclosed in the PCT application, the two distal ends of the cable may be substantially parallel, with a reflective surface positioned above the distal ends, thereby creating an optical path from the light source cable to the light receiver cable by bouncing light (light may be visible light, infrared light, ultraviolet light (such as black lights, etc.)), off the reflective surface. See FIG. 11 of the PCT. However, the configuration shown in that FIG. 11 is not sufficiently compact to create a compact activator for use in a small bodied switch, such as a small diameter float switch.

SUMMARY OF THE INVENTION

The invention comprises an optical switch activator with the optical fibers disposed in an optical housing, where the optical fibers are disposed or aligned on one side of the housing. The fibers may be in an in-line configuration, such as parallel optical fibers. The activator may be deployed in a float, either a narrow angle or wide angle embodiment. In a wide angle configuration, the activator may include a delay means (internal or external to the housing of the activator). The activator may also be deployed in any type of mechanical or human activated switch. The invention also includes any type of optical switch where the switch housing or movable means is partially constructed of a material that will glow with reflected or emitted light, or the switch housing contains a fluid that will glow.

BRIEF DESCRIPTION OF THE DRAWINGS

FIG. 6A is a cartoon showing a wide angle float embodiment.

FIG. 11A shows optical path present, while

FIG. 12A shows optical path present, while

FIG. 13A shows optical path present, while

DETAILED DESCRIPTION OF THE INVENTION

Figure 1A:
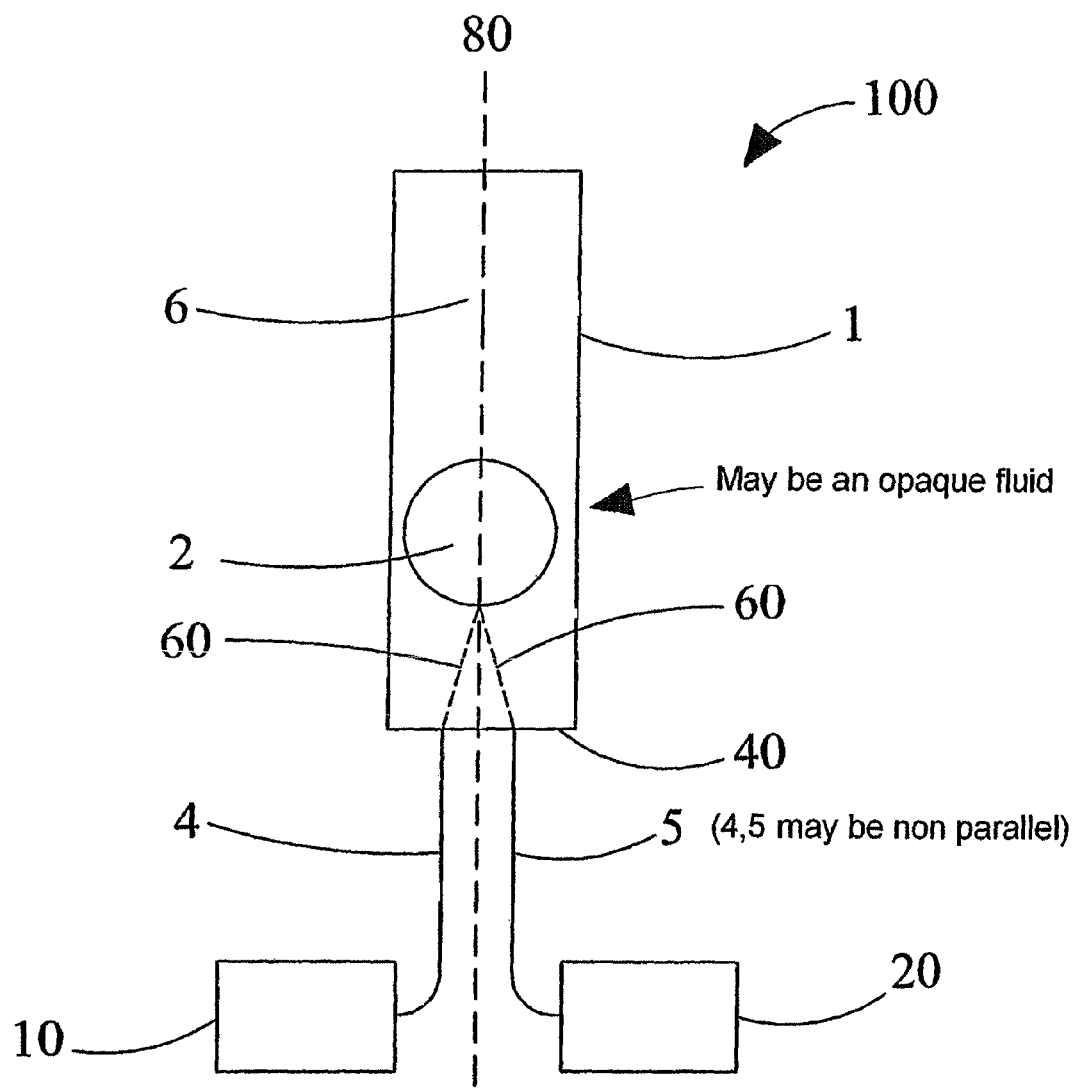
FIG. 1A is one embodiment of the invention with optical path present.

FIG. 1A shows one embodiment of the optical switch 100. Shown is activator housing 1 (here shown as a hollow plastic cylinder), a light source 10 (such as a LED) and a light receiver 20, and two light guides 4 and 5; one guide 4 connected to the light source with distal end terminating at or in the activator housing, the other light guide 5 connected to the light receiver 20 with distal end terminating at or in the housing. Also, contained in the activator interior 6 is a movable means 2 (here shown as a rollable ball). The housing 1 is any device used to restrain movement of the movable means, and is not required to be a vial or closeable chamber. It may be desirable, but not required, that a friction reducing fluid be contained in a closed housing, such as mineral oil, or polydimethylsiloxane, available from Clearco Products of Bensalem, Pa. (grade 350 being preferred), and used, for instance, as a delay means.

Figure 7:
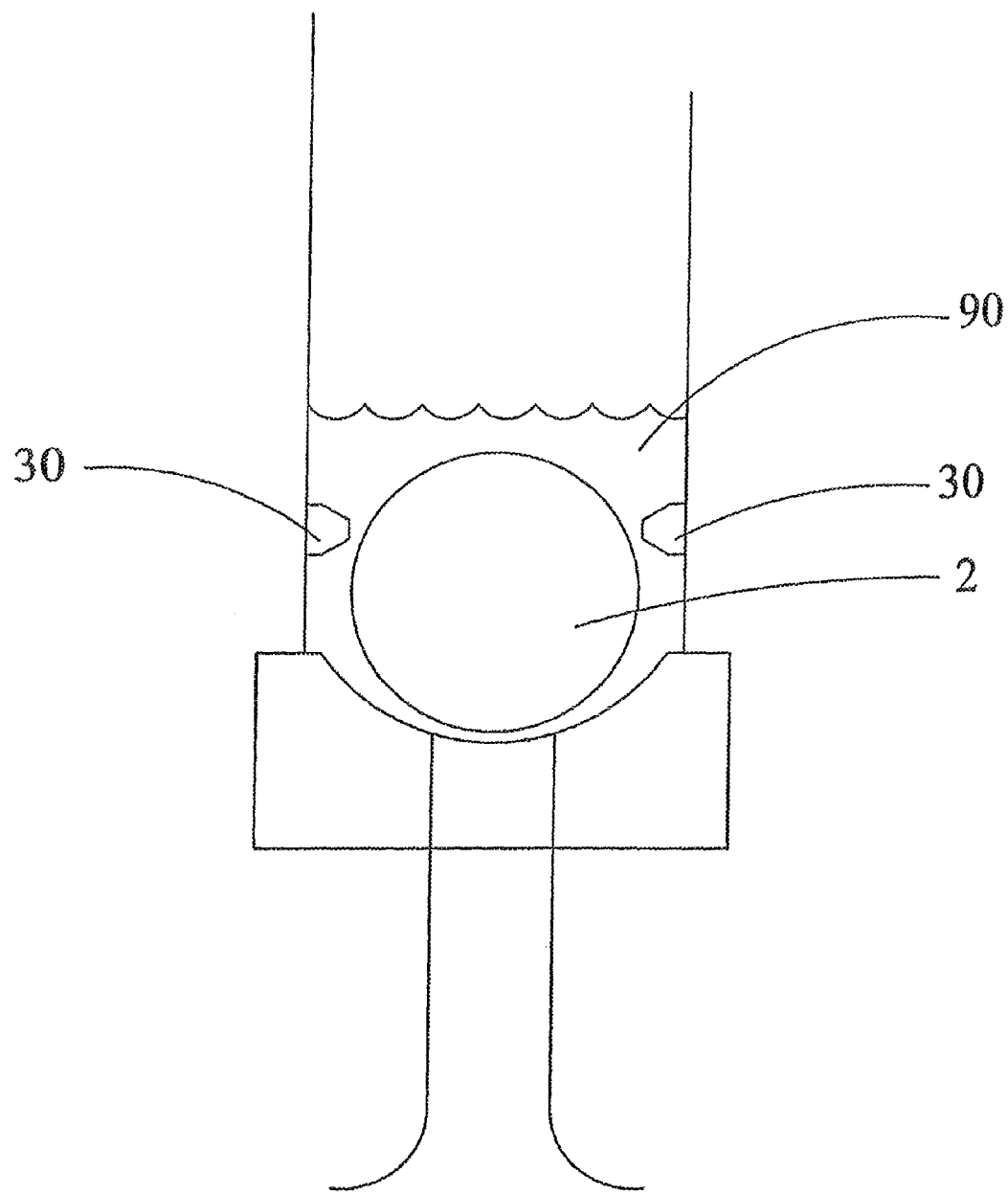
FIG. 7 is a cross section though one embodiment of a housing having a delay means.
Figure 15:
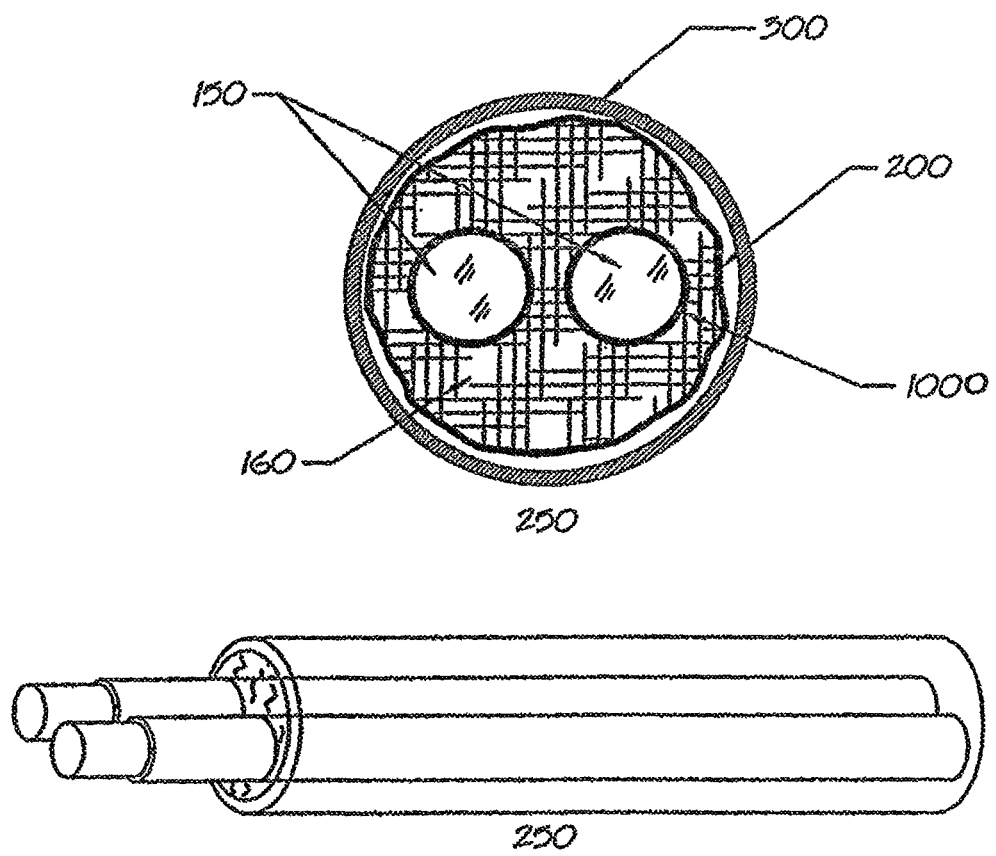
FIG. 15 is a prospective view of one embodiment of an optical cable for use with the switch activator.

As can be seen, the two light guides 4, 5 terminate in or near the housing 1 adjacent to one another with the ends of the distal cables being substantially aligned with the axis of the housing (so light is transmitted down the housing, instead of "across" the housing). Additionally, (not shown) the two light guides may terminate on the exterior of the housing if the exterior of the housing is optically transmissive. With a switch in a floatable housing, the optical fibers will bend as the float rises and falls. Over a period of time, the bending of the optic fibers can result in fracture or severing of the fibers, potentially destroying the functioning of the switch. To help alleviate this, a fairly stout tether cable design is preferred. Shown in FIG. 15 is one suitable design 250. The twin fiber optic cables 150 (here shown as 1 mm diameter sheathed with a polyvinylchloride (PVC) coating 100) are positioned in the interior of an outer sheath member 300, here a 0.020 inch thick PVC extruded watertight jacket, used for strength. More than two optic fibers may be located in the cable. The fiber-optic cables or light guides are deployed in a filler material 160 in the interior of the extruded sheath 300. As shown in FIG. 7, the filler material is very fine hair-like polypropylene fibers, all contained in a paper wrap 200. As constructed, the interior of the tether cable 250 is substantially filled, leaving very little freedom of movement for the optical fibers within the interior. In the design shown, it is preferred that both optic fibers be sheathed to prevent shorting of the switch in the cable (particularly for the use of side glow cables (not preferred), for end glow cables, this may not be necessary). For long tether lengths, it may be preferred to include a strong reinforcing cable, such as a steel, Kevlar, carbon fiber, etc. cable within or attached to, the tether cable structure.

Shown in FIG. 15 is a cable that houses two optic fibers. The cable may contain more than two fibers. The inventor's prior shown embodiments of an optical switch generally orientated the two fibers so that one of the fibers was "visible" to the other fiber across a gap in the housing (see the referenced PCT), where the "means to interrupt" the light path between the two fiber was an opaque material that was movable to position in the gap between the two fibers), thereby interrupting (or modifying) light transmission between the two fibers. The means to interrupt optical alignment may be for instance, a rollable or slidable ball or bar or cylinder, or an opaque fluid positioned within the internal chamber partially filling the chamber. If the housing floats, at a certain level the floating housing will tilt (as it is tethered by action of the cable that is tied to an internal or external fixed weight, or the housing is attached to another stationary device with a cable or tether) and as it tilts, the means to interrupt optical alignment will move within the internal chamber due to gravitational forces. If the degree of movement is sufficient, the means to interrupt optical alignment will block (or unblock) the light path between the two terminal ends of the fiber optic cables 2. To accomplish this, the light fibers in those switch activators were orientated at a substantial angle across the switch housing axis, such as at a right angle to the housing axis. Orientation of the light guides across the axis of the housing are referred to herein as "side activated configurations." In the side activated configurations, two light guides could be parallel, or at an angle, or opposing each other.

In one embodiment of the present invention, the axis of the activator housing (represented in FIG. 1A by dashed line 80), along which the movable means follows, is substantially aligned with the orientation of the distal ends of the light guides as they terminate at the housing. The light guides point substantially "down" the housing (in the direction of motion of the movable means), instead of across the housing (perpendicular to the direction of motion of the movable means). The light guides may still be at an angle to the housing axis in the "inline" configuration, (for instance, 0-30 degrees from the axis (still considered substantially aligned with the axis of the switch activator housing)), but in the inline configuration, in several embodiments, occludes or blocks the transmission of light from one of the distal ends of the light fibers without moving to a position interposed between the fibers. Note, however, the two fiber ends may have a gap between them, even when both fibers are aligned with the axis of the switch housing, and the movable means occludes at least one cable end and thus also occupies the gap between the two optical fibers—in this event, the movable means still interrupts transmission by occupying the gap between the fiber ends.

Figure 1B:
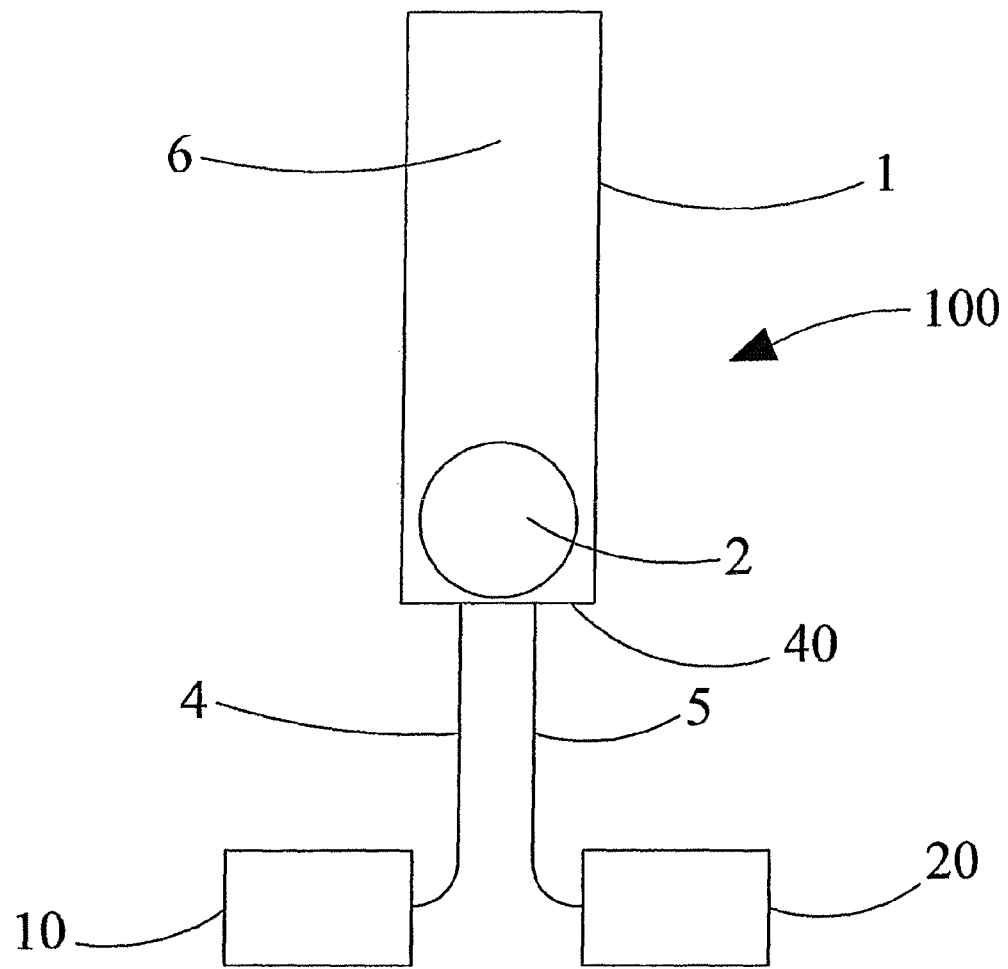
FIG. 1B is the embodiment of the invention with optical path absent.
Figure 3A:
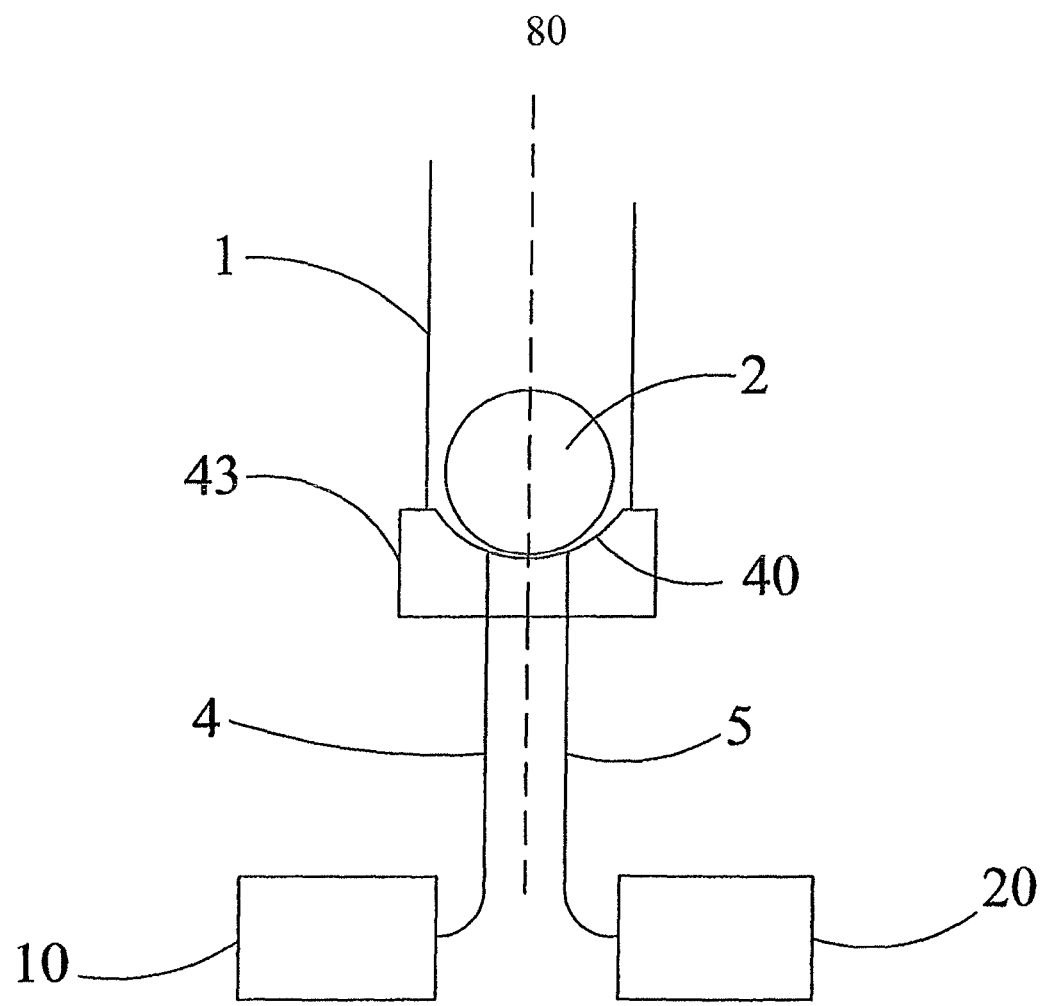
FIG. 3A is a detail cross section of the end of a housing, detailing one possible end cap configuration.
Figure 3B:
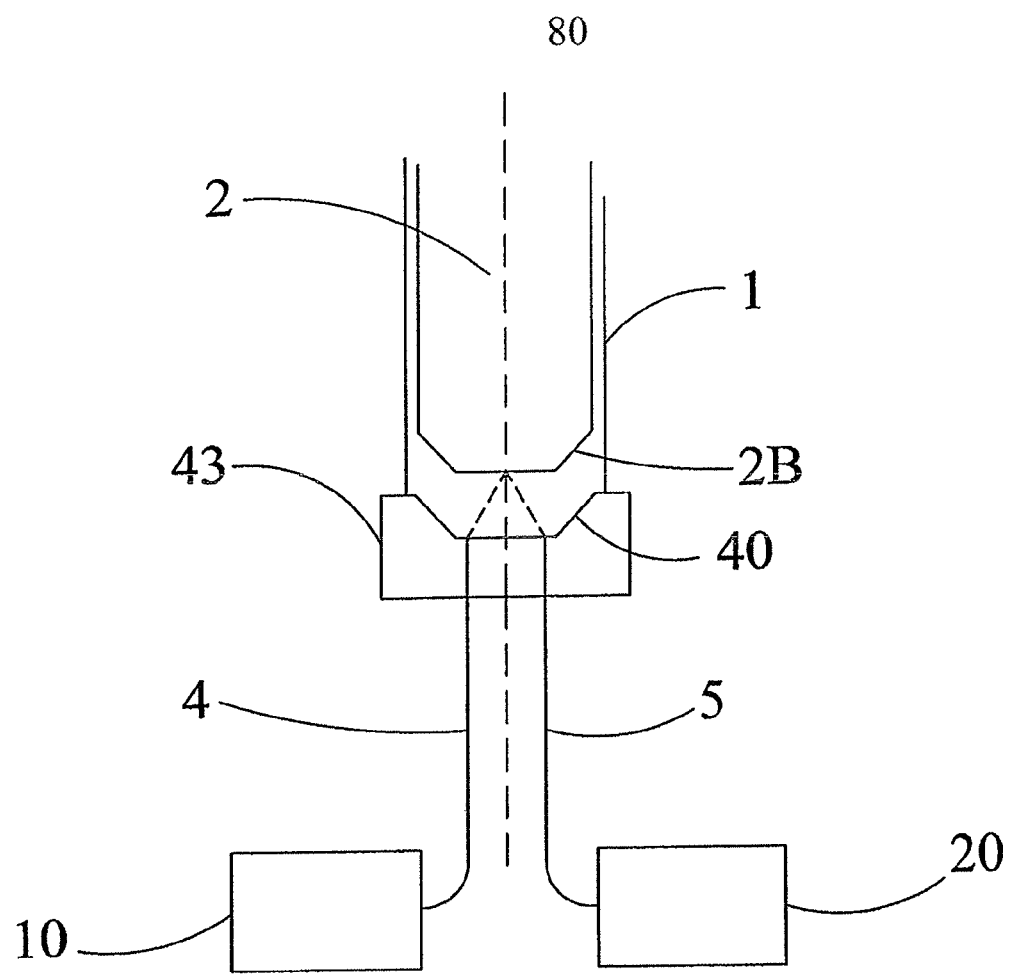
FIG. 3B is a detail of another end cap configuration when a beveled plug is used.

Generally, if the housing is a vial or ampoule, the light guides will be positioned in an endcap of the vial. With this housing/cable orientation, the movable means 2 may have a reflective surface that faces the light guides 4, 5 (see FIG. 1A). In the inline configuration, the two distal ends of the optic fibers 4 and 5, and the moveable means 2, create an "optical path present" condition generally throughout the range of motion of the movable means 2 within the housing. As used, optical path present means that the light emitted by one fiber is picked up by the other fiber with sufficient intensity to be detected by the light detection circuitry. In an inline configuration, this generally implies a light path that reflects off one or more surfaces in the switch activator. As shown in FIG. 1A, the optical path is from the source fiber to the receiver fiber, reflecting off the moveable means (the optical path is depicted by the dotted lines 60 in FIG. 1A), provided, however, that the strength of the emitted light, after reflection, upon arrival at the receiver fiber, is sufficiently intense for detection by the light receiver 20. The optical path between the distal ends of the cables remains uninterrupted until the movable means moves to occlude or block transmission from at least one of the distal ends of the light guides to the other light guide (optical path between the fiber ends is now absent). As shown in FIG. 1B, the moveable means is positioned adjacent to that portion 40 of the housing where the optical fibers enter the housing. In the position shown in FIG. 1B, both distal ends 4, 5 are occluded by the moveable means 2, preventing the formation of an optical path. To assist in occludation of at least one of the distal ends of the light guides, the portion of the housing where the cables enter may be formed in a shape that accommodates the shape of movable means 2. For instance, shown in FIG. 3A is a rolling ball movable means 2. The housing 1 terminates in a cap 43 into which the cable ends are positioned. The surface of the cap facing the interior of the housing is hemispherically shaped to accommodate the rollable ball. As shown in FIG. 3B, the movable means 2 is a slidable plug, with one end 2B of the plug beveled. Again, the housing 1 terminates in a cap 43, where the interior of the cap is shaped to accommodate the beveled end of the plug 2.

Figure 2A:
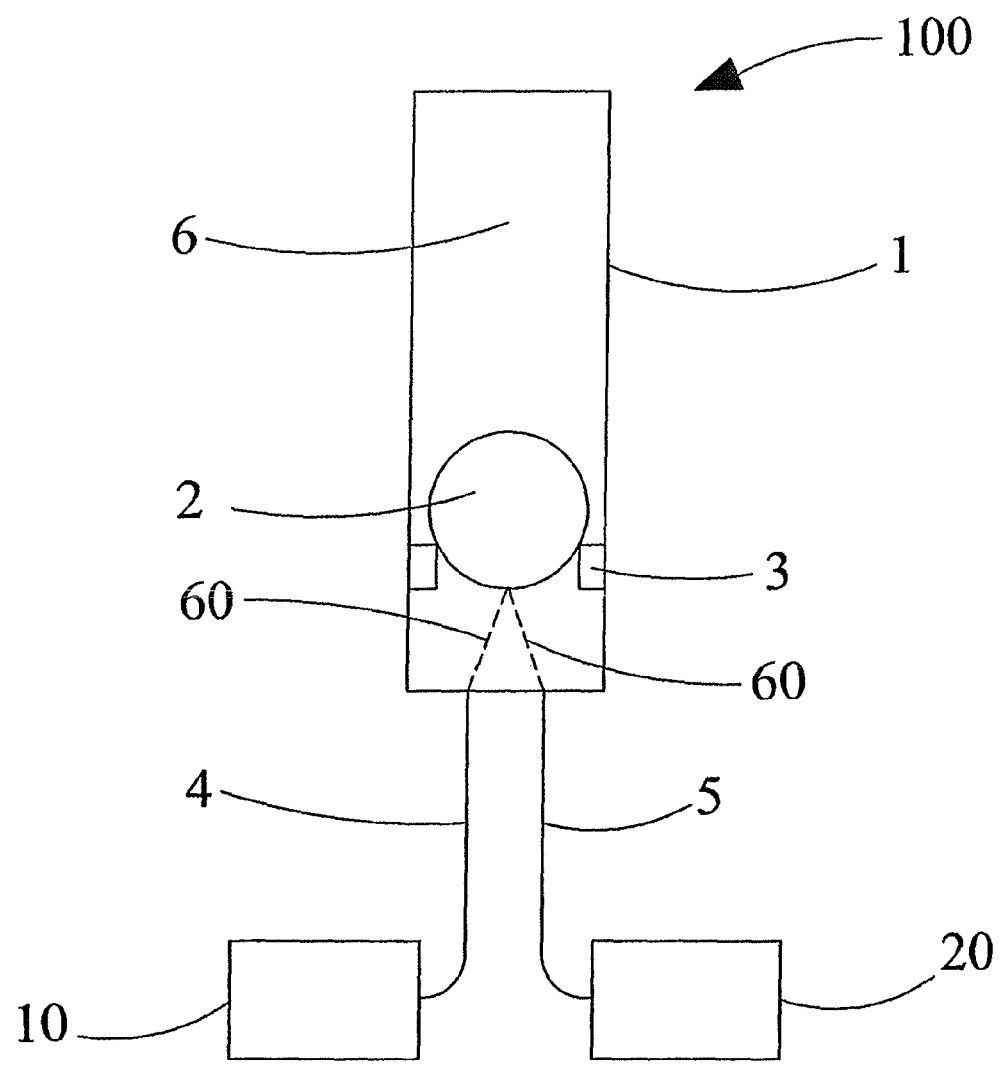
FIG. 2A is another embodiment of the invention using a stop ring with optical path present.
Figure 2B:
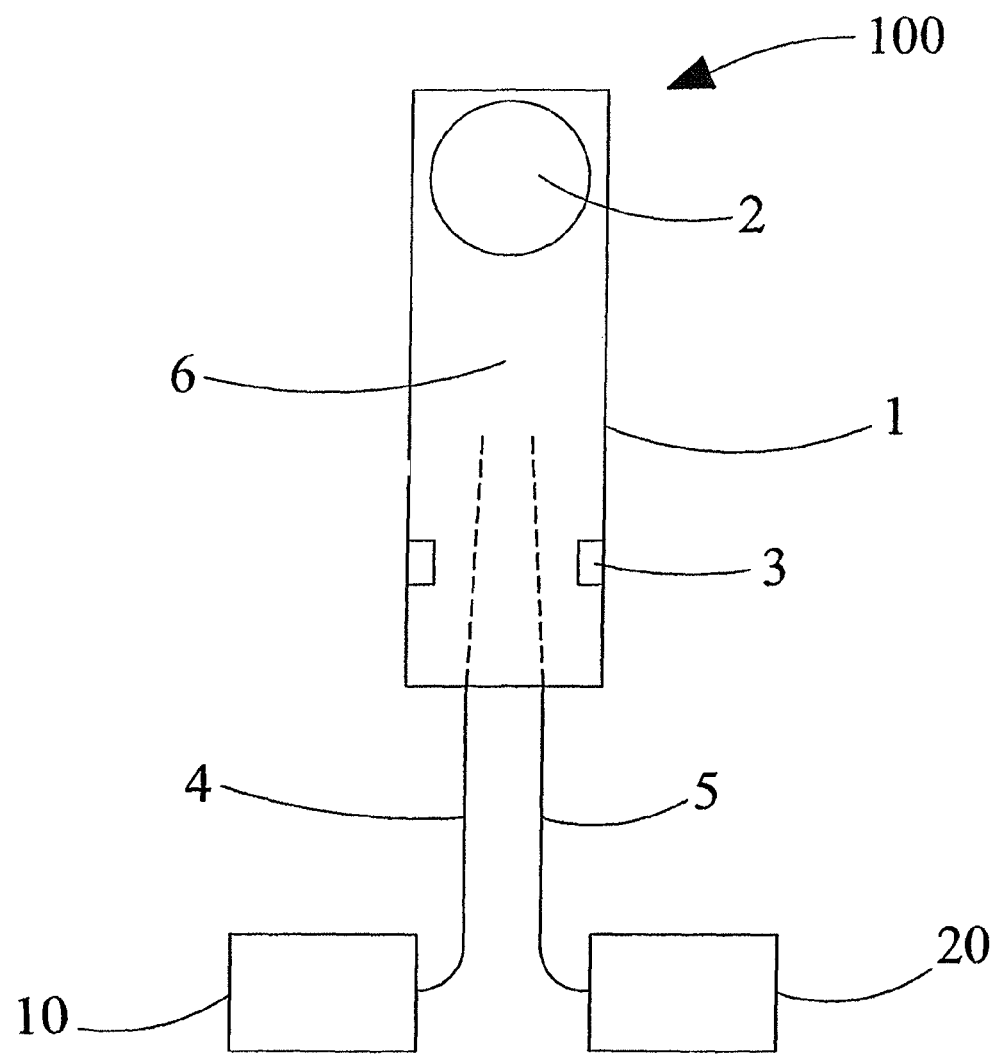
FIG. 2B is the embodiment of the invention in FIG. 2A with optical path absent.
Figure 2C:
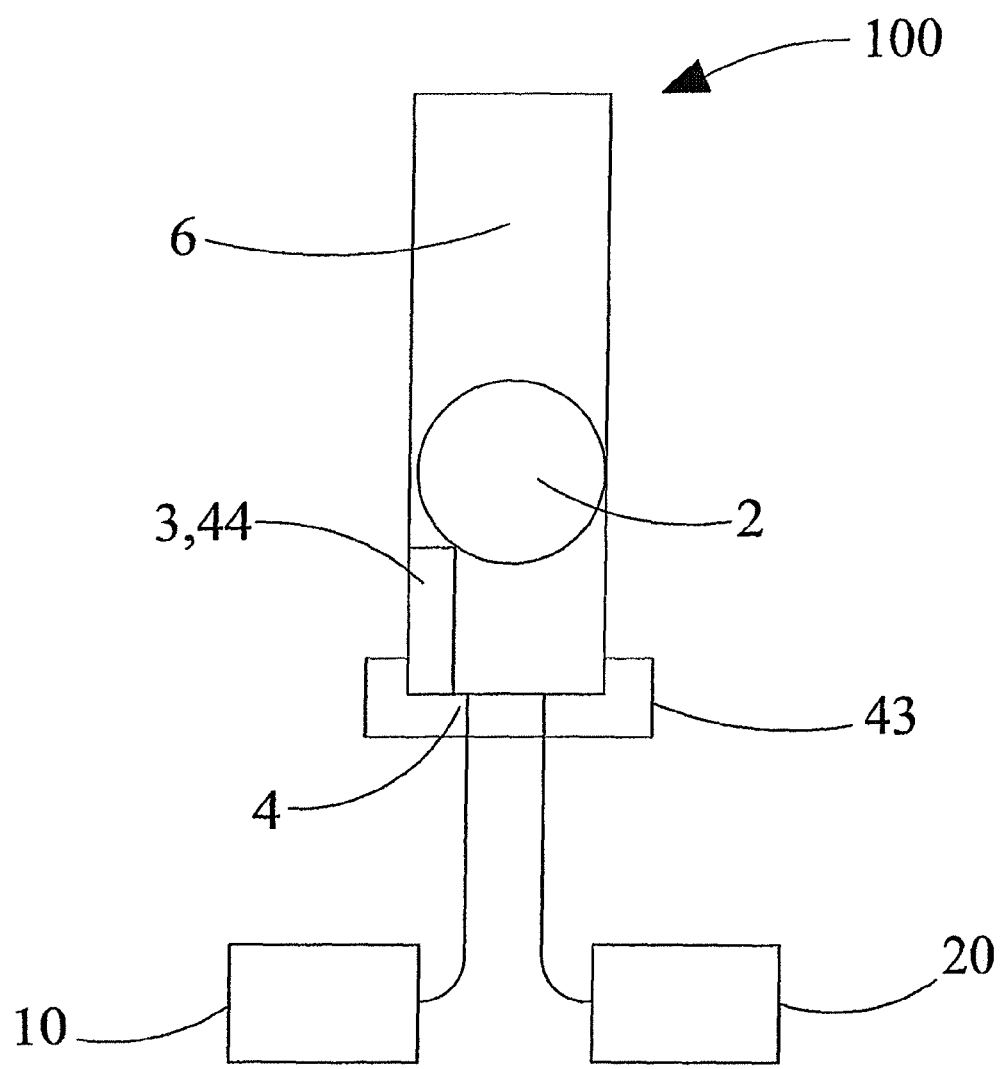
FIG. 2C is another embodiment of the invention of FIG. 2A using a different stop means.

Another embodiment of the optical switch 100 is shown in FIGS. 2A and 2B. The structure in FIG. 2A is comparable to that of FIG. 1A except the housing is longer, and the interior of the housing contains a stop means 3. Stop means 3 may be an annular ring, ledge or partial ridge positioned in the interior of the housing 1, or an inward projection 44 located on a endcap 43 on the housing (see FIG. 2C), or other device to prevent the movable means 2 from passing the stop means 3. Preferably, stop means is not reflective. In this embodiment, a light path is always present from source fiber to receiver fiber when moveable means is anywhere in the interior until the moveable means is so far distant that the reflected light received at the receiver fiber is so attenuated that is not detected by the light receiver. The length of the housing necessary will depend upon the strength of the light source at the emitting distal end 4 and the sensitivity of the receiver 20.

Figure 2D:
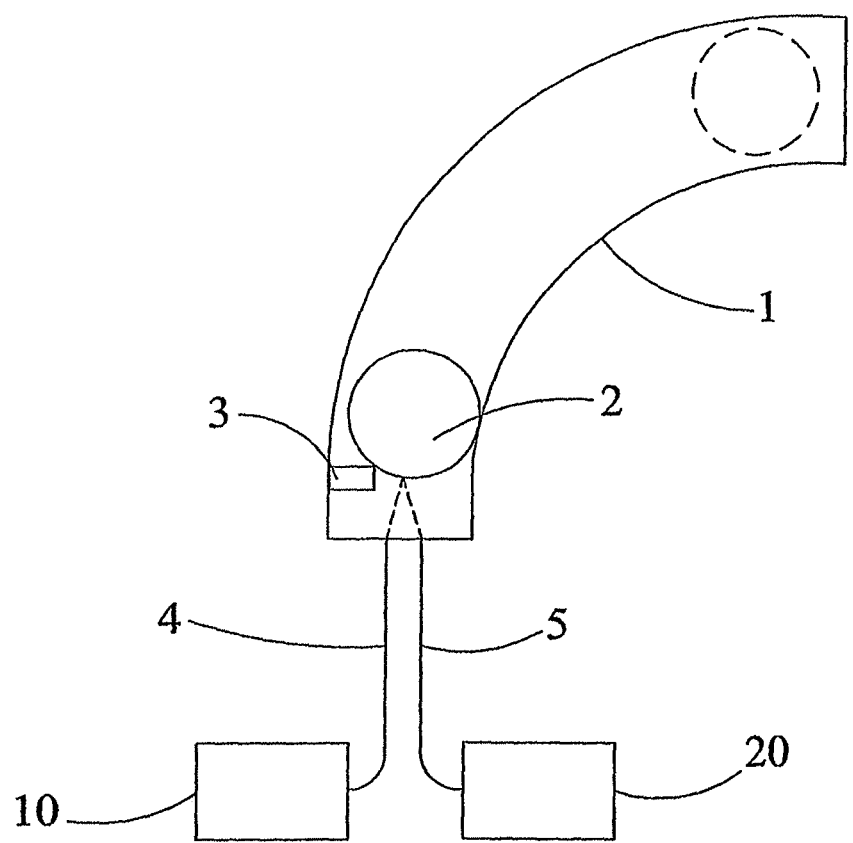
FIG. 2D is another embodiment of the invention using a curved housing.

An alternative embodiment would be to utilize a curved housing, such as shown in FIG. 2D. In this embodiment, the reflective surface of the movable means 2 is not "visible" by the emitted light beam when the moveable means is positioned at the far end of the activator housing (shown by the dashed Figure in FIG. 2d). However, this configuration is not preferred, as the compactness of the activator is compromised, and for a float embodiment (later described), the axis of the housing is preferably substantially aligned with the axis of the float body.

Figure 4A:
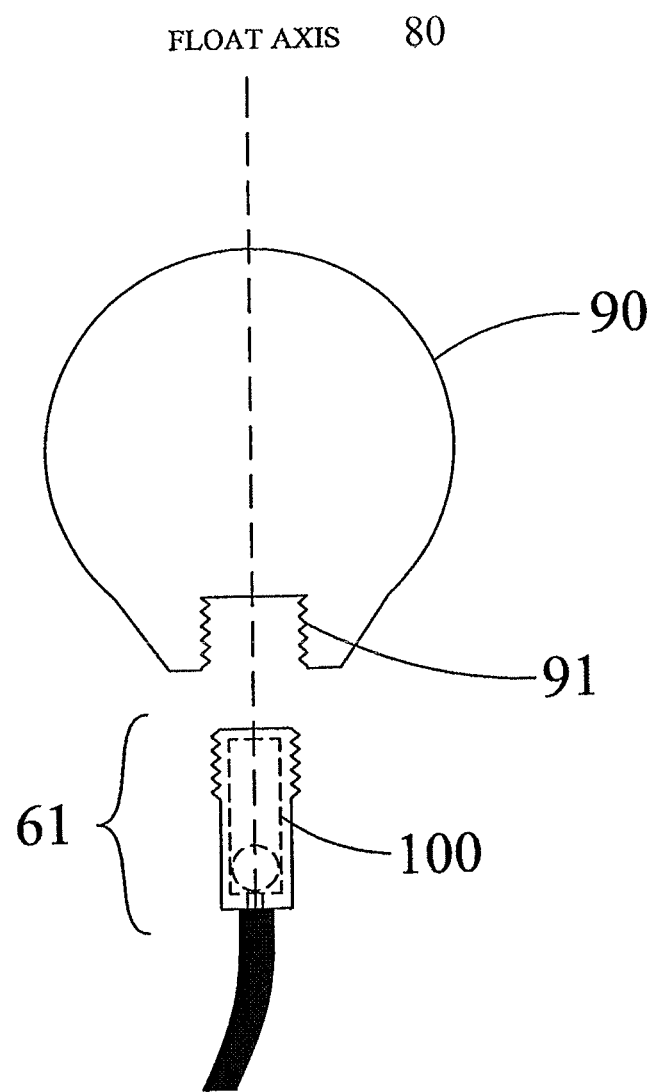
FIG. 4A is a cartoon showing a threaded housing for threading into a collar of a float.
Figure 4B:
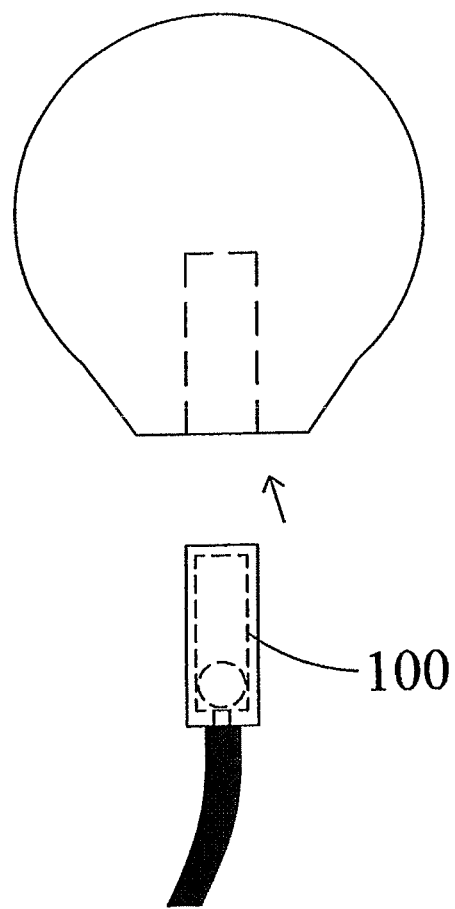
FIG. 4B is a cartoon showing a housing sized to be inserted into an internal chamber in a float.

As can be seen, the inline configuration, particularly where the distal ends are positioned parallel such as shown in FIG. 1A, presents a compact activator that may be used as an optical switch in any switch application. A preferred embodiment is to position the switch activator in a float or floatable switch. With the present activator, the float body can be of smaller diameter than previous configurations, as there is no need to position the optical fibers substantially at right angles to the axis of the activator housing. The present activator can be made as a sealed unit that can be used to replace or retrofit older generation mercury switch activators or mechanical activators. For instance, shown in FIG. 4A is a typical stainless steel float 90 with a threaded collar 91 positioned on the float 90. Switch activator body 61 of the present invention has a matching threaded portion at the end of the housing distal from the cables, and may simply be threaded into the float collar 91. FIG. 4B shows a prior generation float that typically uses a mercury switch activator with the float and was powered by electrical current. Due to the need to reduce the uses of mercury, it is expected that these types of switch activators will be phased out. The prior mercury switch activated float may have the mercury switch removed, and the new optical switch activator fixed into place in the interior of the float, such as by potting. Alternatively, if the switch activator is a sealed unit, the activator may simply be attached to the float tether cable near the float body.

In a float embodiment, the housing containing the movable means may be mounted on a flexible paddle, and the paddle mounted in the float body, so that the paddle flexes in response to a shock load. One embodiment of such a paddle is disclosed in PCT/US2009/051714, hereby incorporated by reference. The paddle shape should be modified for the particular shape of the float body chosen.

Another embodiment of the switch activator 100 design depicted in FIG. 1A, is to construct the housing 1 or a portion of the housing (such as partial liner in the housing) from a material that will reflect or re-emit the light from the emitter or source light guide, resulting in that portion of the housing to appear to glow (the moveable means may be constructed from such a glowable material in the embodiment depicted in FIGS. 2A and 2B). Alternatively, the friction reducing material may be a fluid that will re-emit light (not necessarily of the same characteristics as the illuminating light) when illuminated by a suitable light source and hence appear to glow. For instance, fluorescent additives may be used in the friction reducing fluid for illumination with an ultra-violet black light from the light source 10. The receiver should be configured to detect the light emitted or reflected by the housing or the fluid, as the case may be, and the reflected or emitted light may be of different characteristics (e.g. frequency, polarization) from the illuminating light.

One material suitable for use as a glowable material in the housing is a high reflectance ceramic material, Accuflect, available from Accuratus Corp of Phillipsburg, N.J. Accuflect will glow when illuminated by a LED, and the glow is detectable with a sufficiently sensitive light detector. Using a housing adapted to reflect or glow, or a fluid adapted to emit light when excited by the source light, the configuration switch activator of FIG. 1A would be "optical path present" until the configuration shown in FIG. 1B is achieved, where the movable means occludes one of the light guides. In this embodiment, a non-reflective movable means is preferred. The use of a housing or frictional fluid that re-emits or reflects light is not restricted to the present embodiments, but could be used in any optical switch, in particular, those disclosed in PCT/US2007/70122.

Figure 11A:
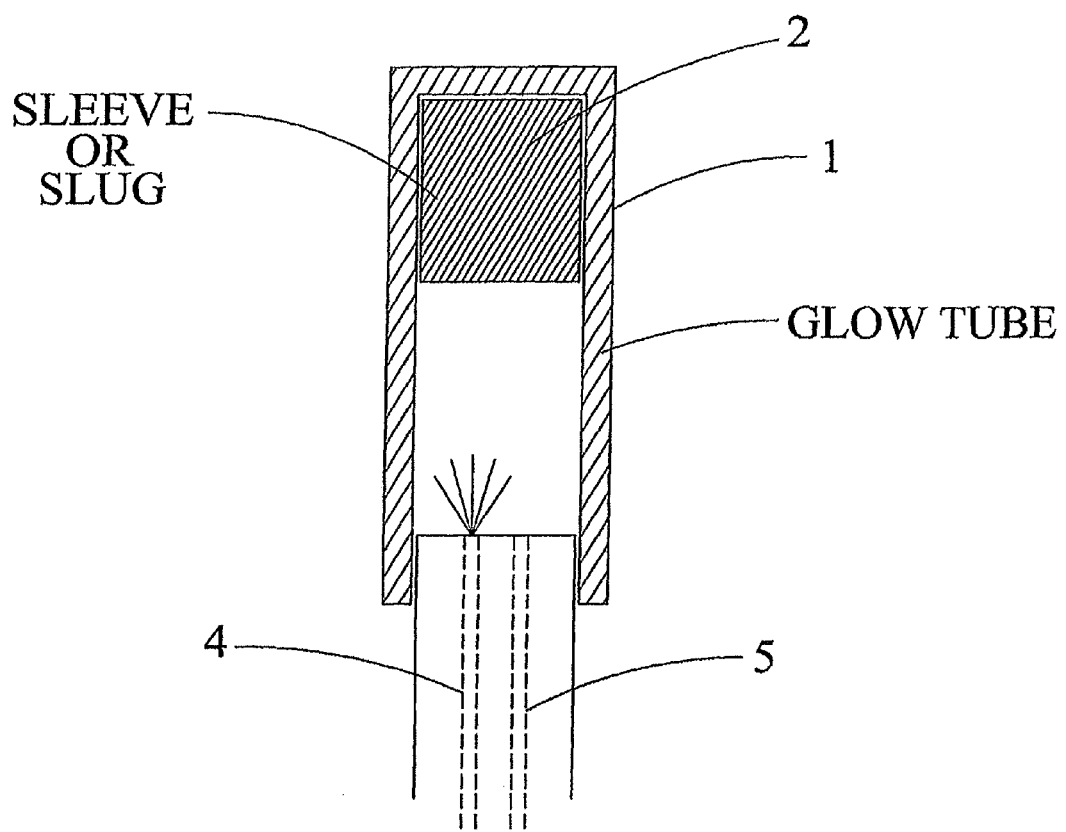
FIGS. 11A and B are cross section views through one embodiment using glowable material as the housing.
Figure 11B:
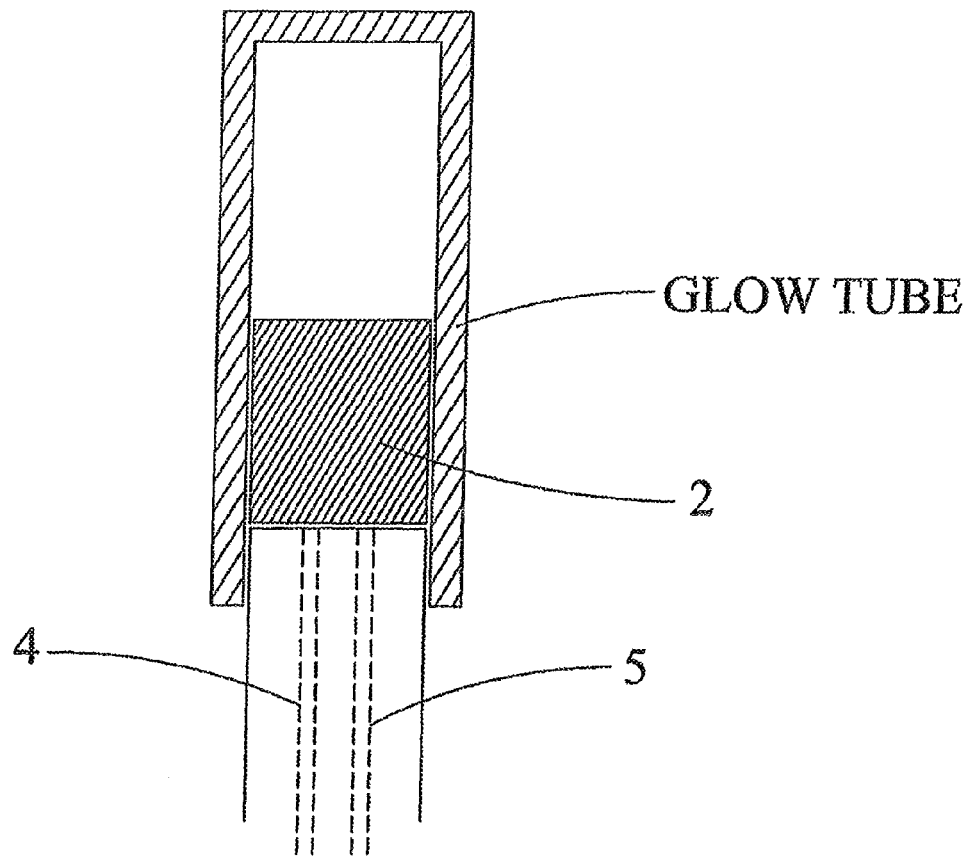
FIG. 11B shows optical path absent.
Figure 12A:
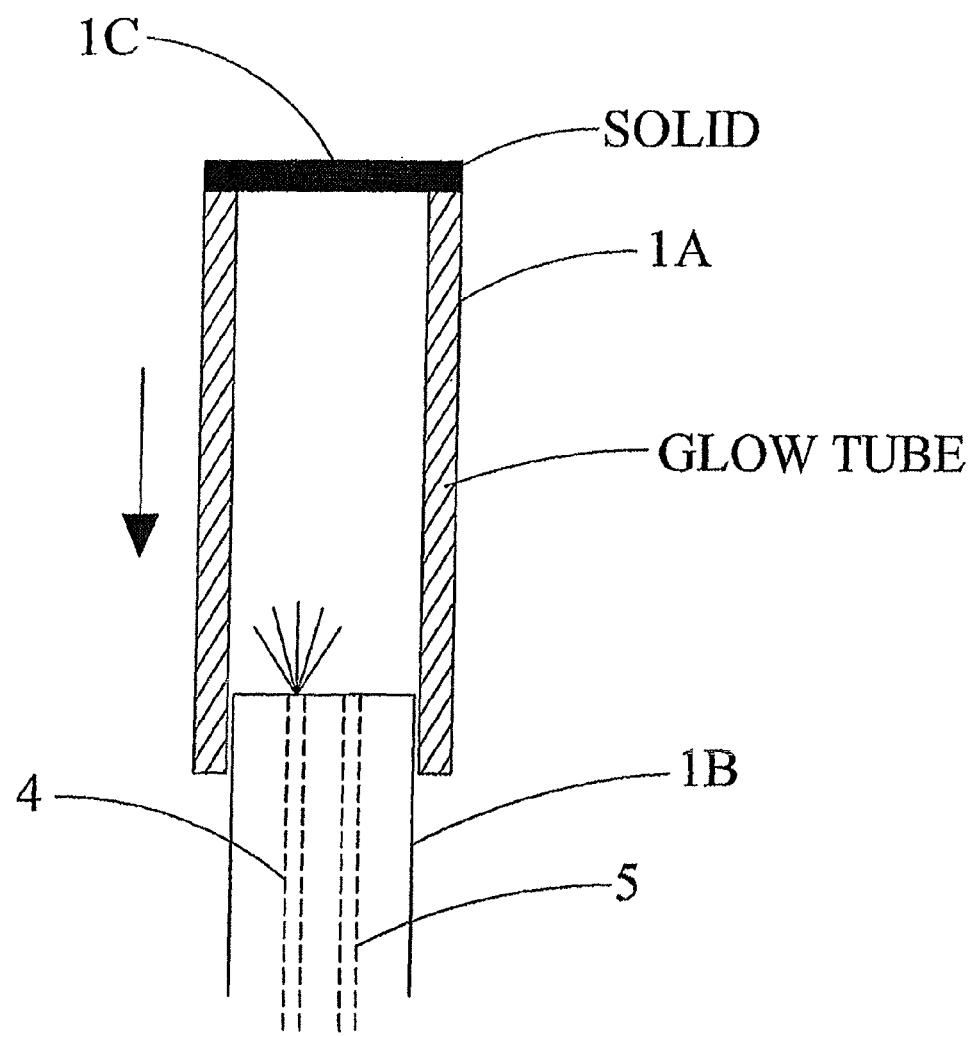
FIGS. 12A and B are cross section views through another embodiment using glowable material in the switch housing.
Figure 12B:
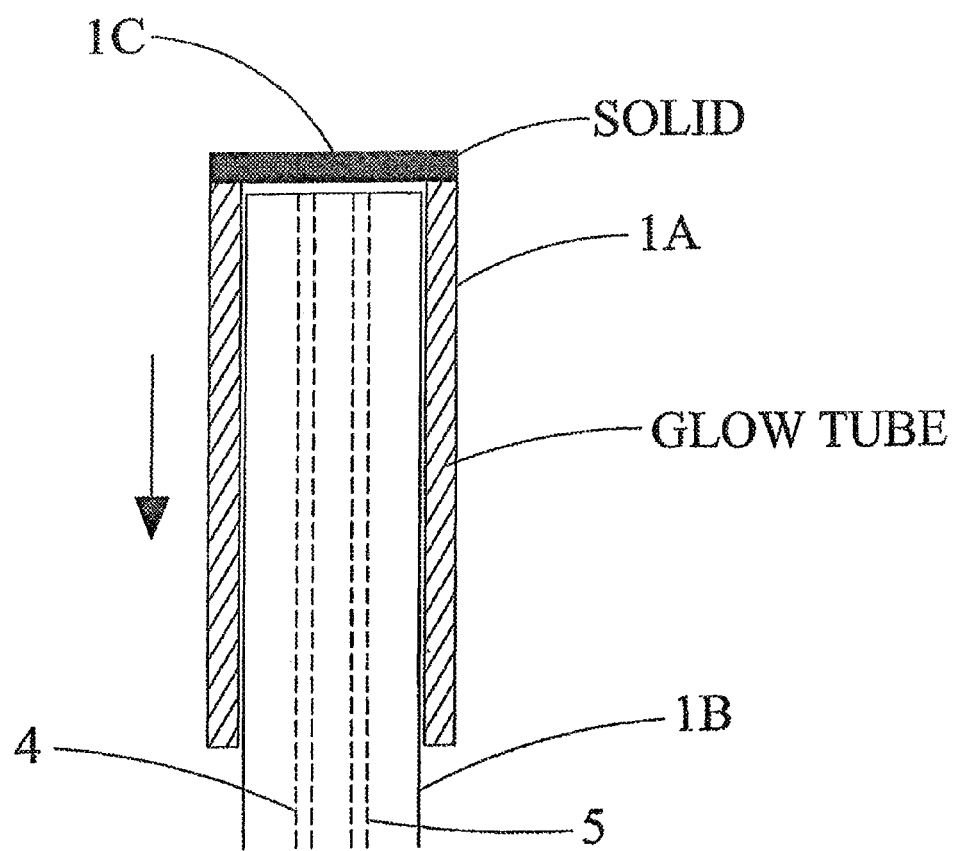
FIG. 12B shows optical path absent.
Figure 13A:
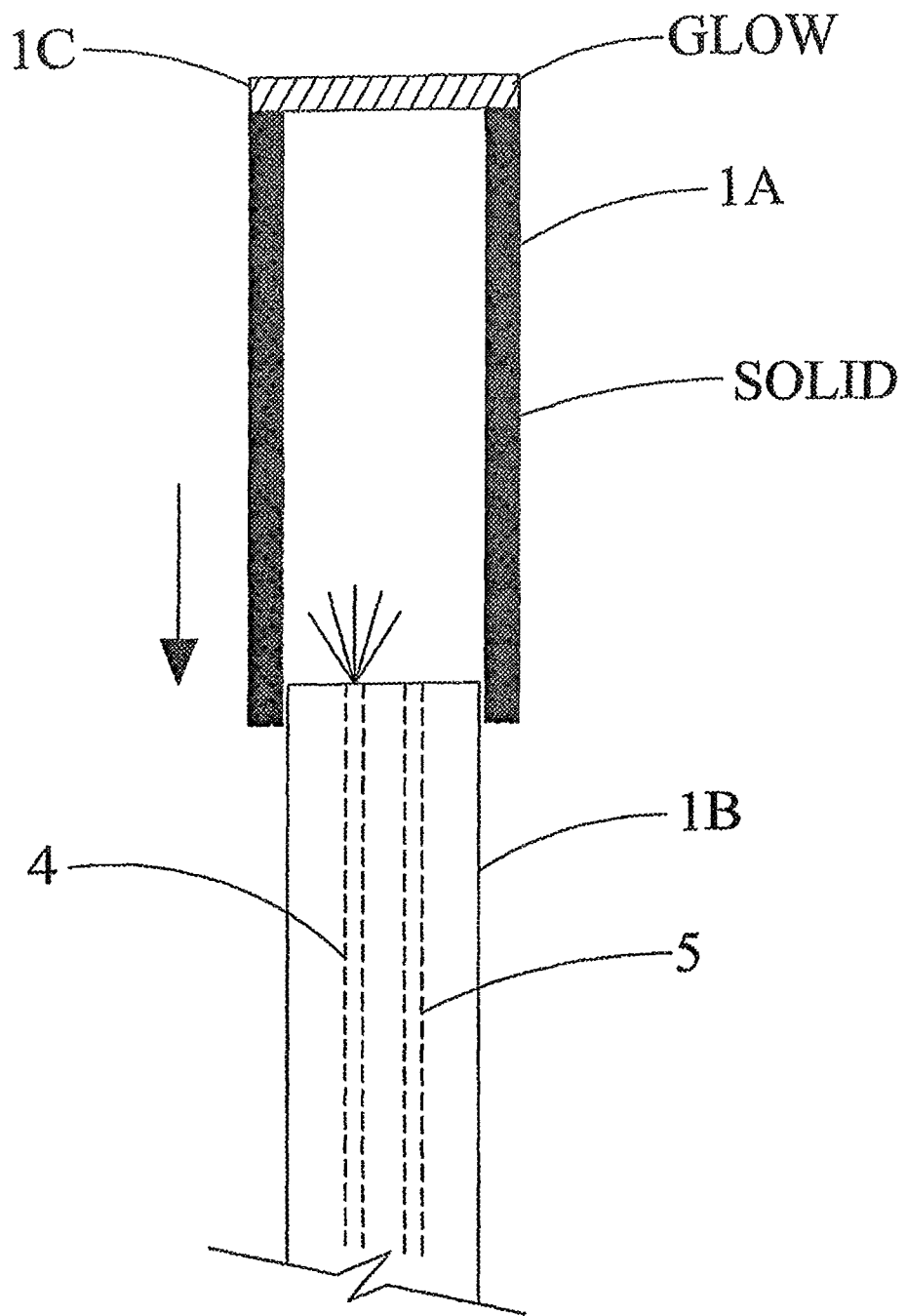
FIGS. 13A and B are cross section views through one embodiment using glowable material as the moveable member.
Figure 13B:
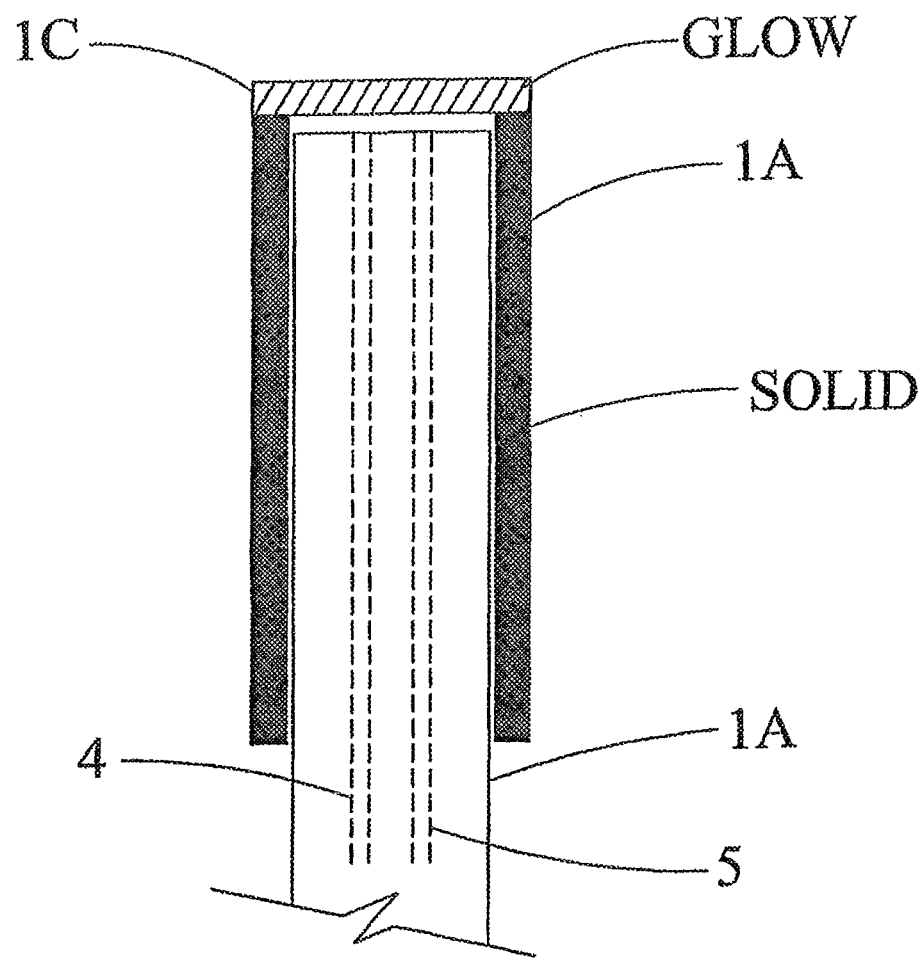
FIG. 13B shows optical path absent.

Particular embodiments of the housing using a glowable material are shown in FIGS. 11, 12 and 13. Shown in FIGS. 11A and 11B is an embodiment where the housing 1 is constructed from a glowable material. Located and slidable or rollable in the housing is a movable means 2. In the configuration of FIG. 11A, light is emitted from the distal end of fiber 4. The emitted light is absorbed by the housing 1 and re-emitted, where it is detected by a light detector connected to fiber 5. As shown in FIG. 11B, movable means 2 has moved to a position adjacent the fibers 4, and 5, and hence, in this embodiment, movable means blocks or occludes for the distal end of both emitting fiber 4 and receiving fiber 5 (for the switch, it is not necessary to block both distal ends). In the configuration shown in FIG. 12A and B, housing comprises a slidable member 1A (here a cylinder), and a fixed member 1B (also shown as a cylinder). As shown, fixed member 1B contains the distal ends of the fibers 4, and 5. Housing 1A side is constructed of glowable material, while housing 1A end or cap 1C is an opaque material (opaque in the sense that it effectively blocks transmission of light from the source to the light detector—for instance, if the emitted light is white, and the light receiver is sensitive to red light, then cap 1C may be transmissive, but comprise a green filter, so that light received by light receiver 5, after passing through cap 1C, is not of the characteristic to which the light detector is sensitive). As shown in FIG. 12A, light emitted from fiber 4 is reemitted by glowable housing 1A side, and detected by light receiver connected to fiber 5. In FIG. 12 the housing 1A has slide down housing portion 1B, and end cap 1C occults the transmission path between the two fibers. The embodiment shown in FIGS. 13A and B is similar to that shown in FIGS. 12A and B, but in this instance, sidewall of housing portion 1A is opaque, while endcap 1C is glowable. In the configuration of FIG. 13A, the end cap 1C is sufficiently distant from the emitter fiber so that any re-emitted light is too weak to be detected by light detector connected to receiving fiber 5. In the configuration shown in FIG. 13B, housing portion 1A has slid toward housing portion 1B sufficiently so that the light re-emitted by glowable cap 1C is detectable by a light detector connected to fiber 5. As described, these embodiments are generally the in-line configuration, although the glowable member tube or movable member may be used in a side-activated environment (for instance, the walls are glowable material, and the moveable member is opaque) or in almost any configuration. As an example, the two fibers can be at opposite ends of the switch housing, for instance, on the same side of the housing, pointed across the axis of movement of the moveable member. The moveable member would be a glowable member—hence, when the movable member crosses the path of the light source distal end, the moveable member will glow thereby allowing the light receiving fiber to detect light; when the glowable movable member moves away from the light source fiber distal end, the moveable member ceases to glow, and hence, no light is detected at the receiving fiber distal end.

Wide Angle Float Embodiment

Figure 5:
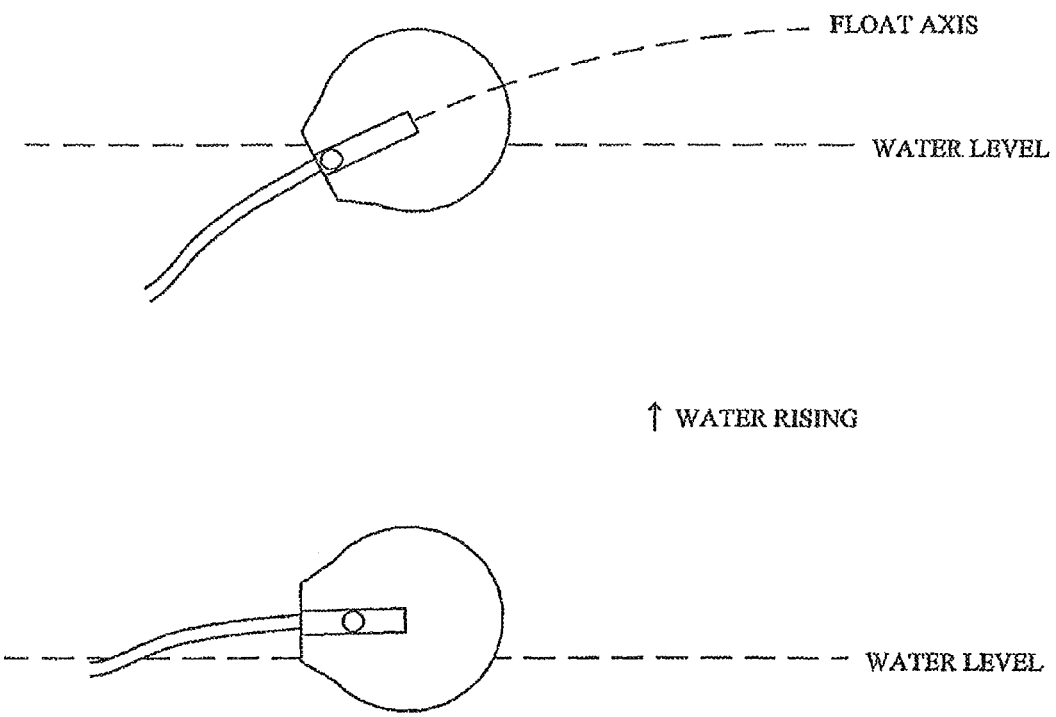
FIG. 5 is a cartoon showing a narrow angle float embodiment.

As disclosed, the activator, when placed in a float body, may be considered a narrow-angle activator—that is, a minor variation in the angle of the float will result in the activator changing position (from optical path present to optical path absent). For instance, when the float is horizontal, a minor move up will result in one switch condition, while a minor move down will result in the opposite switch condition. See FIG. 5. The narrow angle float will operate much like a mercury switch activator. To convert the present activator into a "wide angle" switch activator, a means to delay the movement of the movable means is desired. In some literature, float switches are designed as "tilt" switches or tilt detectors.

Figure 10:
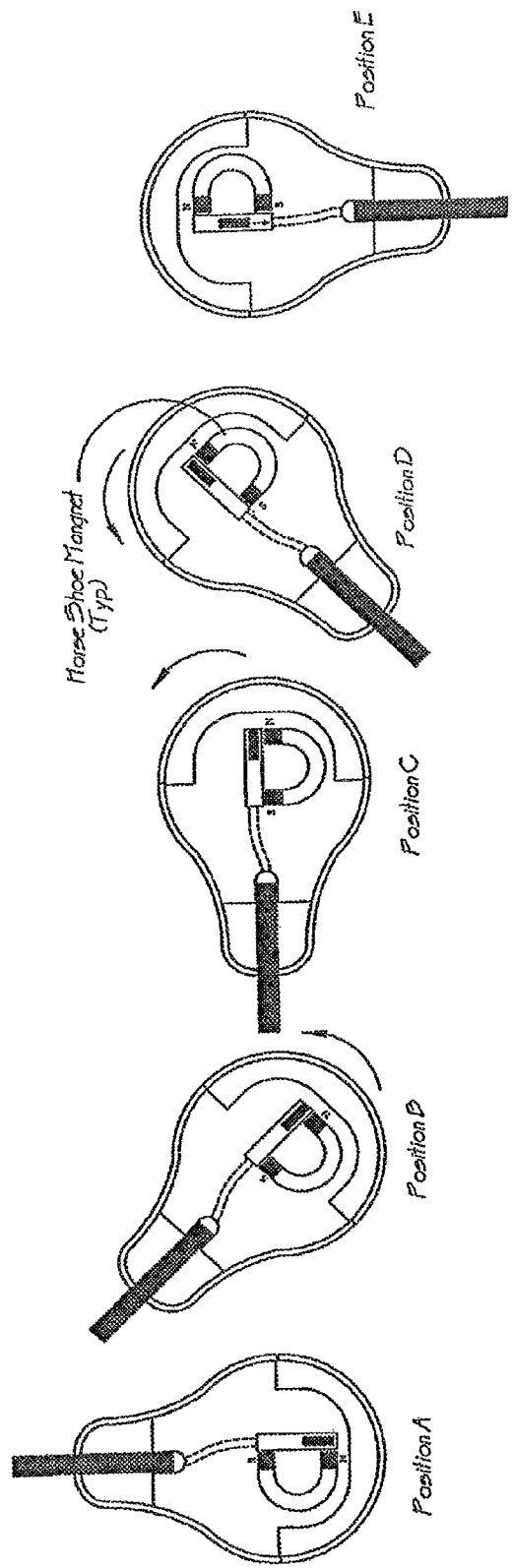
FIG. 10 is a cartoon showing a magnet used as a delay means.

The means to delay movement 30 (delay means) of the moveable means includes using magnets suitably positioned along the housing exterior in conjunction with a magnetically interactive movable means. Shown in FIG. 10 is a cartoon depicting the movement of a slidable magnetic interactive cylinder or slug (here stainless steel cylinder (sometimes denoted 300 series stainless steel having approximately 18% chromium and 8% nickel)) in a housing or vial and a "horseshoe" magnet positioned in the interior of the float where the two ends of the horseshoe near the sides or ends of the ampoule. The horseshoe magnet is shown for purposes of illustration and is not preferred (for instance multiple discrete magnets could be employed). As the float moves from position A through position D, rotating "upwardly," the slug "sticks" to housing near the magnet, say near the N pole of the magnet. Before or at position E, the gravitational force overcomes the magnetic force and the slug slides downwardly. As the float rotates "downwardly" from position E downwardly (not shown), the slug will again stick to the housing near the S pole of the horseshoe magnet and will release when the float returns to a position before or at position A.

The actual release point of the slug can vary by modifying the strength of the magnet, the weight of the slug, or the magnetizability of the slug's material. In use, the location of the magnets can vary. For instance, a single donut style magnet positioned around the middle of the chamber or a bar magnet positioned near the middle of the chamber, or using a magnet as the slug and positioning weakly magnetic material at each end of the ampoule or chamber, are possible locations of a magnetic delay means embodiment. As used herein, a weak magnetic interaction means that for a given magnet and slug or moveable structure (or vice versa, where the magnet moves), the magnetic force exerted between the slug or device and magnet is insufficient to overcome the gravitational force acting on the slug, thereby allowing the slug to be released at some point as the position of the slug approaches vertical, as shown in FIG. 10.

Alternatively, the moveable means may have its travel interrupted by a structure located in the interior of the housing, such as ridges or depressions positioned in the interior of the housing to create an area that will catch and hold the movable means until a desired angular movement is exceeded. For instance, shown in FIG. 6A is a delay means 30 that is a ring or annulus 40 positioned in the interior of the housing. A rollable ball 2 is used as the moveable member or movable means 2. The ring 30 in the housing chamber insures that a ball 2 positioned in the chamber will not move from position "a" (unblocked) to position "c" (blocked) without a sufficiently large enough movement of the float to allow the ball to roll over the ridge created by the ring 30. The ending position of the ball 2 would not be altered by minor fluctuations in the float position. The delay means may be created by a series of upstanding projections, for instance four projections at 0, 90, 180 and 270 degrees, or other combination of projections or ridges or depressions that will delay movement of the moveable means until a desired angle is reached (all considered as delay means).

Further, an hourglass shaped vessel may be used, where the neck of the hourglass can pass the rollable ball, or specially designed segmented cylinders, may be employed, where the shape of the chamber is used to delay the motion of the movement means to create a wide angle embodiment. Other movable structures, or other light blocking device (e.g. opaque liquid) may be employed to delay the movement means.

Shown in FIG. 6A is a wide angle float embodiment depicting the movement of the float and light guides as ambient fluid (here depicted as water) rises and falls. The optical fibers are contained in a cable that is tethered or fixed to a location remote from the float body. The moveable means or member 2 must be able to pass over the delay means (such as a ring, annulus or other ridge feature or trough feature in the housing interior), but only when the tilt angle of the float is sufficiently large. The delay means may be shaped to assist the process, such as shown of the ridge delay means 30 shown in FIG. 7.

Figure 6B:
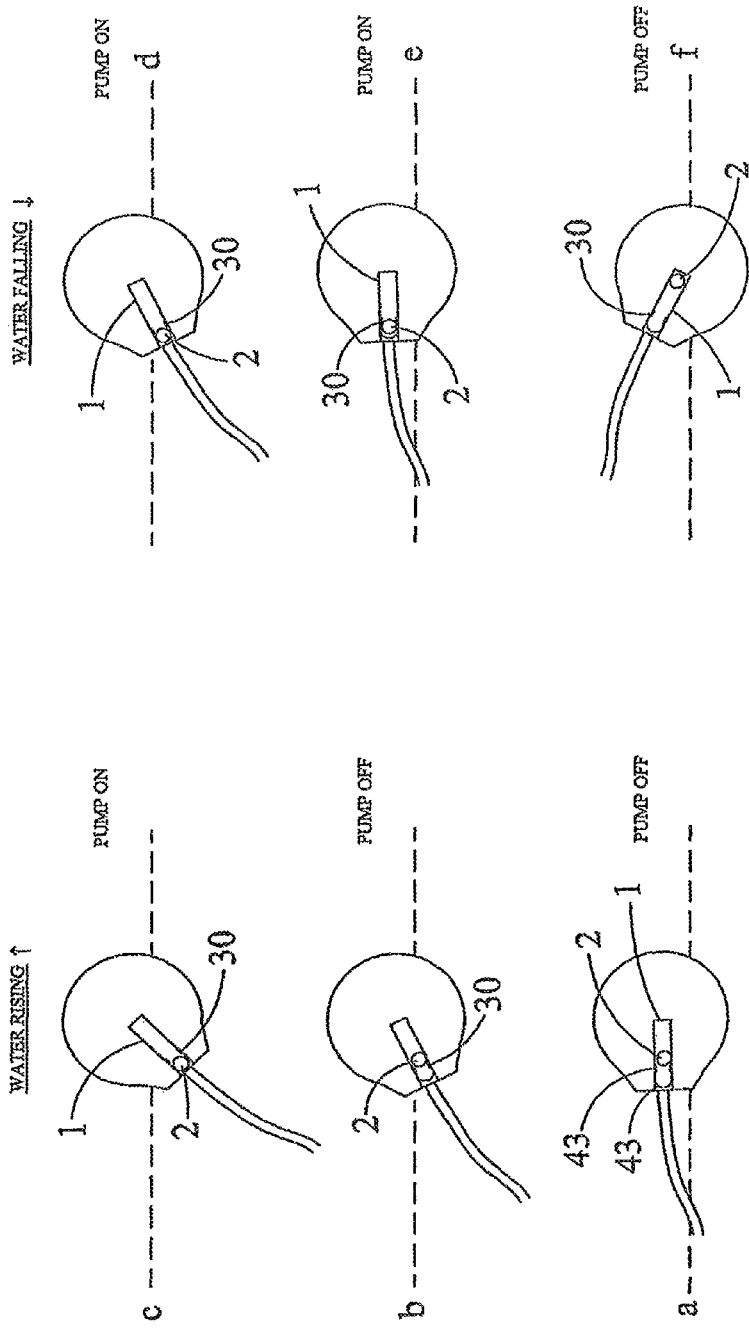
FIG. 6B is a cartoon showing the activator details resulting from the movement of the float in FIG. 6A.

FIG. 6B shows the switch activator used in the embodiment of FIG. 1 incorporating a delay ring 30. As can be seen in FIG. 6B, at position "a", the activator has optical path present. At position "b," with water rising, the movement means gets hung up on the delay means 30. Not until a sufficient angular movement is exceeded, does the movement means 2 clear the delay means 30 (shown as position "c"), creating the condition of optical path absent. It is important that the interaction of the delay means, movement means, and housing (here the end cap) in the embodiment shown in FIG. 6B, maintain the movement means in a blocking relationship with at least one of the light guides as the water falls, in order to maintain "optical path absent" condition until a sufficient angle has been achieved.

For instance, as shown in FIG. 6B, "optical path absent" is the condition shown in positions c, d and e. Hence, the delay means holds or latches or locks the moveable means in place to maintain the activator in an "optical path absent" configuration, blocking one or both of the light guides, until a sufficient angle has been achieved as a result of falling water levels. One embodiment of the delay means for such use is shown in FIG. 7. Shown is delay ring 30, and frictional fluid 90. Delay ring 30 touches the moveable means 2 at its widest point. The frictional forces between the fluid, delay ring and moveable means 2 (here a ball) will keep the movable means 2 in an occluded relationship until a sufficiently large angle is achieved, and gravity will overcome the frictional forces, allowing the ball to pass through the delay ring. A wide angle float can also be achieved with the configuration of FIG. 2, but in this instance, the delay ring is not adjacent the end cap of the housing near the optical fibers, but will be remote from the optical fibers.

The delay means (such as a delay ring) may also be used in "side activated configuration" activators, whether in a float embodiment, or simply a switch. A delay means can be an electronic circuit (such as a timer or RC circuit) that delays the alteration of the switch from one state (e.g. switch "on" or active), to a second state (e.g. switch off or inactive). In this instance, while the delay means does not delay the movement of the movable member, it delays recognition that the movable member has moved, and is also considered as a "means to delay movement of the delay member."

In a float embodiment, a preferred embodiment is a non-orientable float. In such a float, the float body can rotate about an axis through the float (generally, an axis that starts at the tethered cable entry to the float, through the center of the float interior, to exit generally opposite the cable entry). For a non-orientable float, the axis of the switch housing should be substantially aligned with the axis of float body, where rotation of the float about the float axis will not adversely impact the operation of the switch activator.

Sump Pump Embodiment

Figure 9:
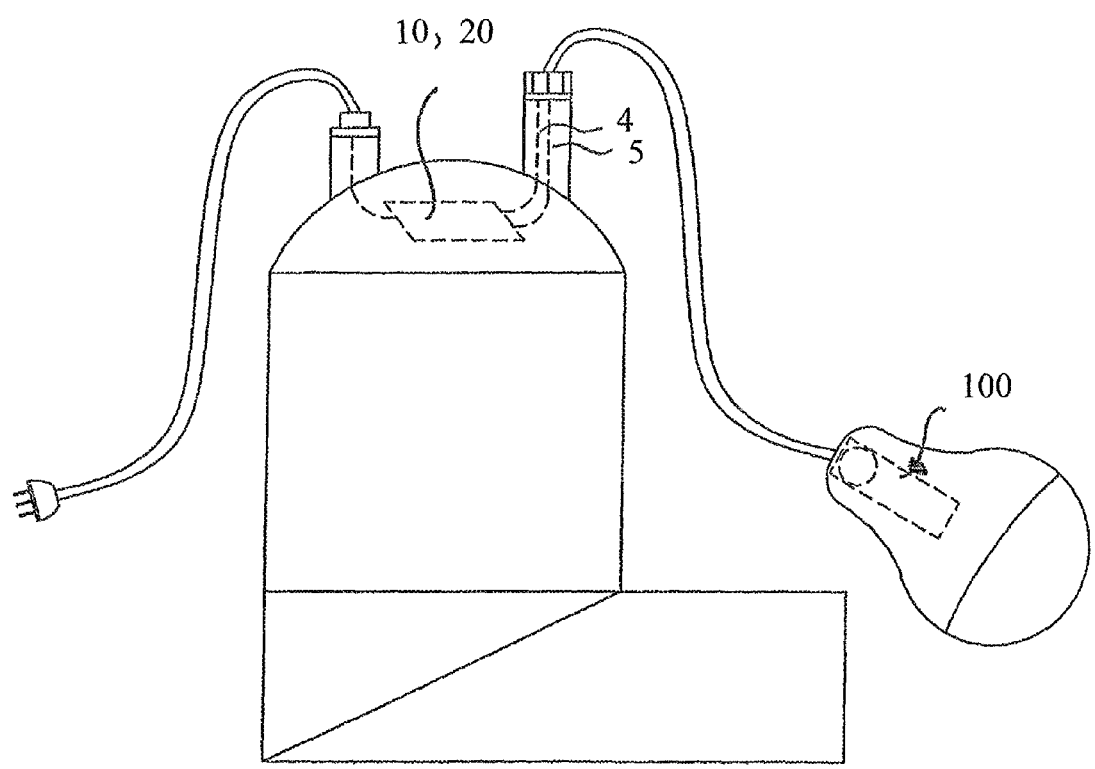
FIG. 9 is a schematic depiction of a sump pump with the optical inline activator, with the light source and light receiver mounted on the top interior covering of the sump pump.

A wide angle float is generally used in a sump pump, a pump used to remove water that has accumulated in a pit used to collect water. A float is used as a switch activator, to turn the pump on when sufficient water is in the pit, and to turn off the pump when sufficient water has been pumped out of the pit. Sump pumps are available from a wide variety of vendors, such as Hydromatic, Zoeller, Wayne, Flotec and many others. Current generation float activated sump pumps use either a mechanical switch activator, or a mercury switch activator. The mechanical activators tend to wear and require replacement, and the mercury switch activators contain a hazardous material. An optical switch activator can solve these problem with the small diameter optical switch float used in sump pumps, where the light source and light detector are located in an internal cavity in the pump, such as near the pump top. A picture of such an embodiment is shown in FIG. 9. In a sump pump, a delay means is usually needed in the device to create a wide angle float activator. Since a sump pump operates in small areas, the inline activator configuration is preferred, such as shown in FIGS. 1 and 2, but the side activated configurations can be used with a sufficiently large float body. In a sump pump, the sump pump will include a pump switch activator that controls the flow of electricity to the pump. The fiber cables have proximal ends that connect to a light receiver and light detector, and the absence or presence of an optical path through the optical switch is used to turn the pump on or off (generally, a relay will be used).

Float Optical Switches

In a float activated switch, it is preferred that a top portion of the float be of a contrasting color from the bottom of the float, or contain a contrasting pattern (such as a bullseye), so that the orientation of the float can be discerned by looking at the float, even in dirty water. One configuration has the top of the float a light color, with the bottom of the float a darker color. This two toned float configuration (multi-toned configurations could be used) allows an operator to tell if the float is facing up or down simply by inspection. The exterior of the float housing thus has an indicia to allow a viewer to identify the orientation of the float.

With a wide angle pump float switch, the float is tethered by the fiber cable, such as to a fixed point, or to a weight or other anchoring means. A preferred cable design is that shown in FIG. 8 of PCT/US2007/70122. Shown is a twin fiber optic cable (a 1 mm diameter sheathed with a polyvinylchloride (PVC) coating 100) positioned in the interior of an outer sheath member, here a 0.020 inch thick PVC extruded watertight jacket, used for strength. More than two optic fibers may be located in the cable. As the cable is subject to flexing or bending at the join or tether point, bendable fibers are more appropriate, such as those available from Corning, Inc. as ClearCurve fibers. A preferred fiber is 1 mm diameter polymetyl-methacrylate (PMMA) resin with a polyethylene jacket. With jacket, the overall diameter is of each fiber is 2.2 mm nominal. One manufacturer of PMMA optical cable is Mitsubishi Rayon Co., LTD. (Tokyo, Japan), type SH 4001. The inventors have found that the PMMA optical fibers are less prone to fracture over repeated bending of the cable. Indeed, the inventors have found the surprising and even stunning result that such a cable design can achieve more than 4,000,000 cycles of flexing without fracturing the fibers (for instance, 18 gauge copper metallic wires fracture around 100,000 cycles). It is believed this is achievable due to allowance of movement of the fibers within the cable, as well as the use of PMMA optical fibers. Other types of fibers may also be suitable.

Figure 14:
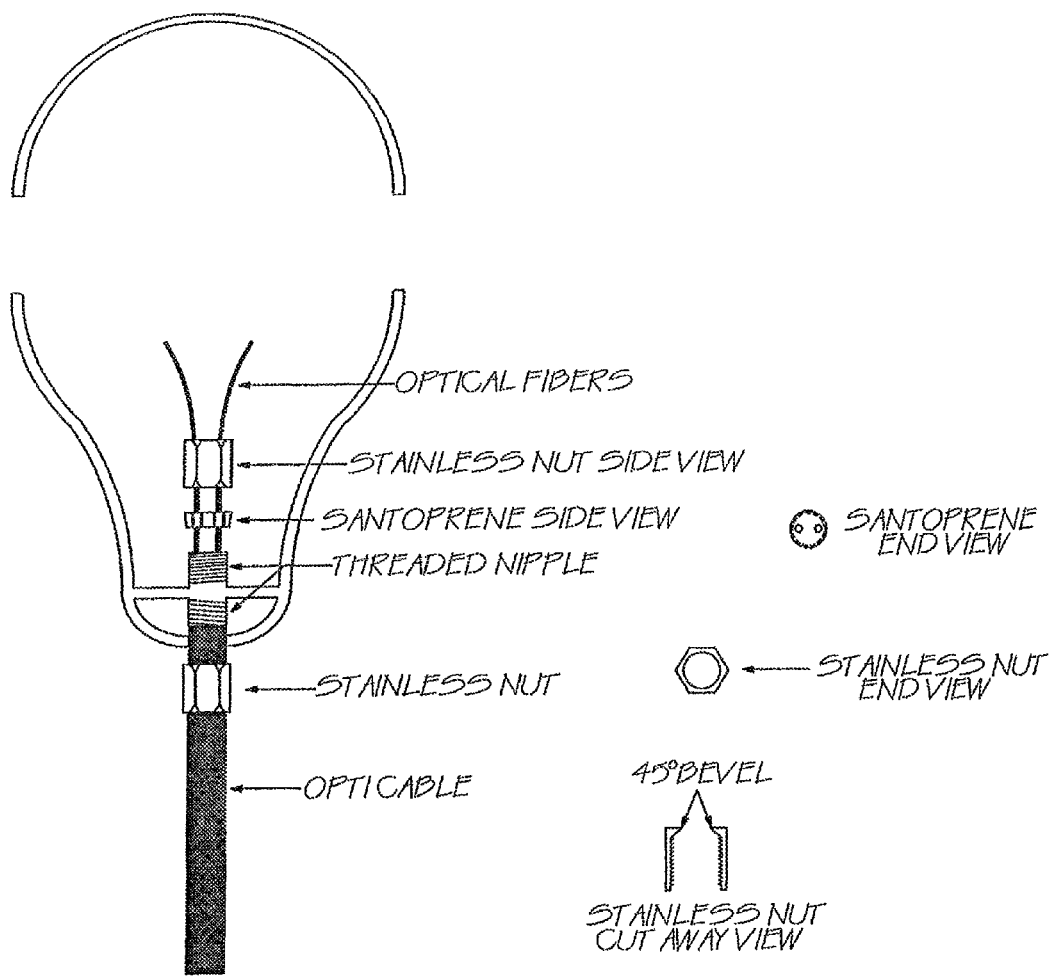
FIG. 14 is a partial cross section through one embodiment of a float switch detailing the technique to seal the fibers in the float interior.

In a wide angle float switch embodiment, the float shell design shown in PCT/US2009/051714 is one preferred embodiment. Also, disclosed in that PCT application is a method of sealing the cables in the housing. An improved method is to externally thread both sides of the cable conduit (41A and 41B in FIG. 8 of the PCT) within the float interior, and to thread the two fibers through a santoprene stopper, shore 72A (santoprene is a thermoplastic vulcanizate material, and may be obtained from Advanced Elastomer Systems, L.P), and then to seal the stopper against the cables by applying pressure through a stainless steel fitting threaded over the stopper (see FIG. 14). The fitting has a beveled internal flange at the top which meshes with the bevel on the stopper as it is tightened, thus forming a permanent seal to seal out liquids. On the bottom of the cable conduit (closest to the cable entry to the float), a similar fitting may be employed, which, when tightened, squeezes against the outer cable jacket, thus making a second seal. This second seal is also designed to crimp into the outer jacket of the cable and prevent movement of the cable, thus allowing the cable to support heavy amounts of debris that can accumulate on a float. (see FIG. 14). A third seal may be used with the bottom fitting. The third seal preferably consists of a flat annular Santoprene washer that is installed on the outer cable jacket. The washer will be forced inside the cable channel by the fixture, thus forming an additional tight seal.

Other Embodiments

Figure 8A:
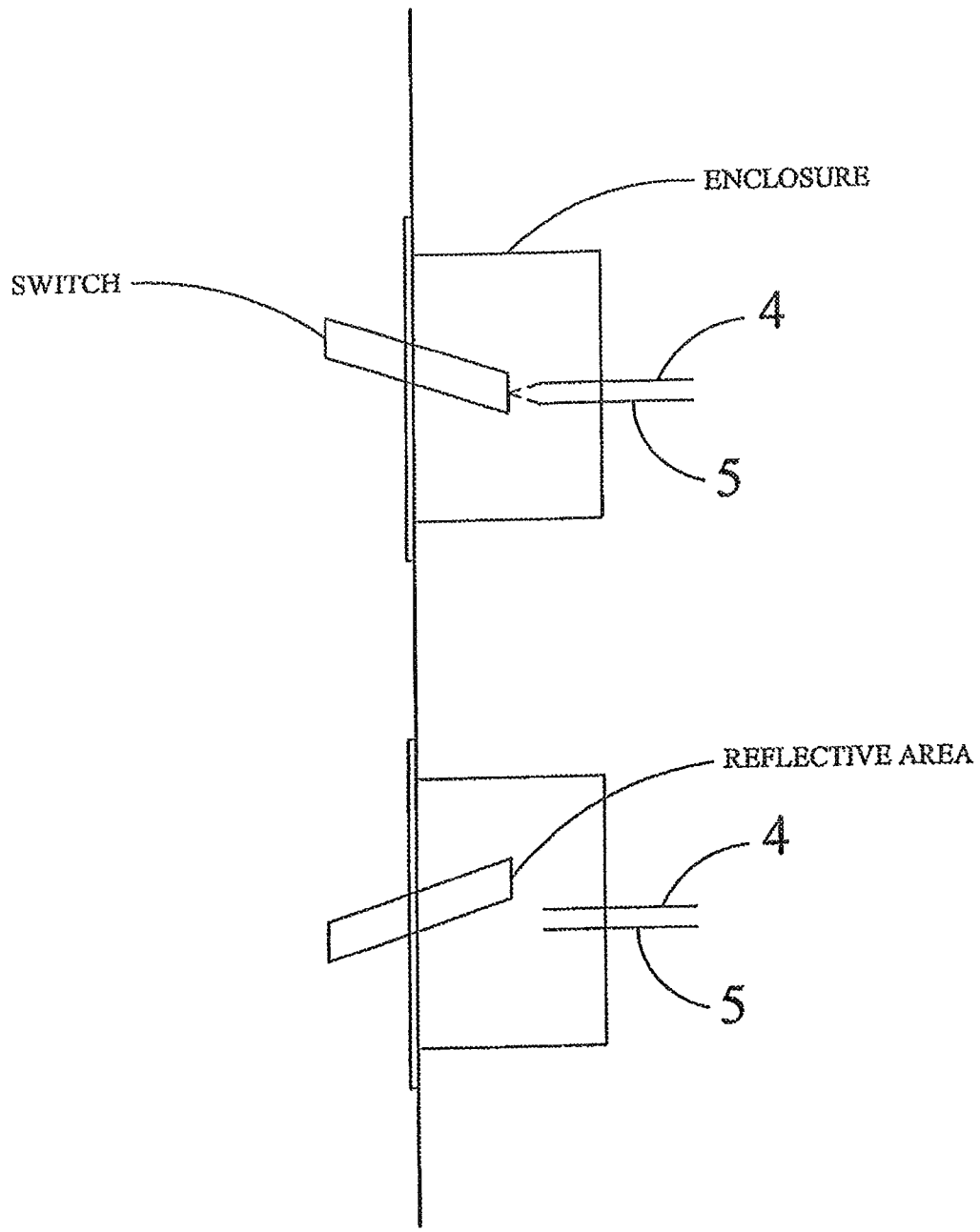
FIG. 8A is a cartoon depiction of a toggle wall switch using the activator.
Figure 8B:
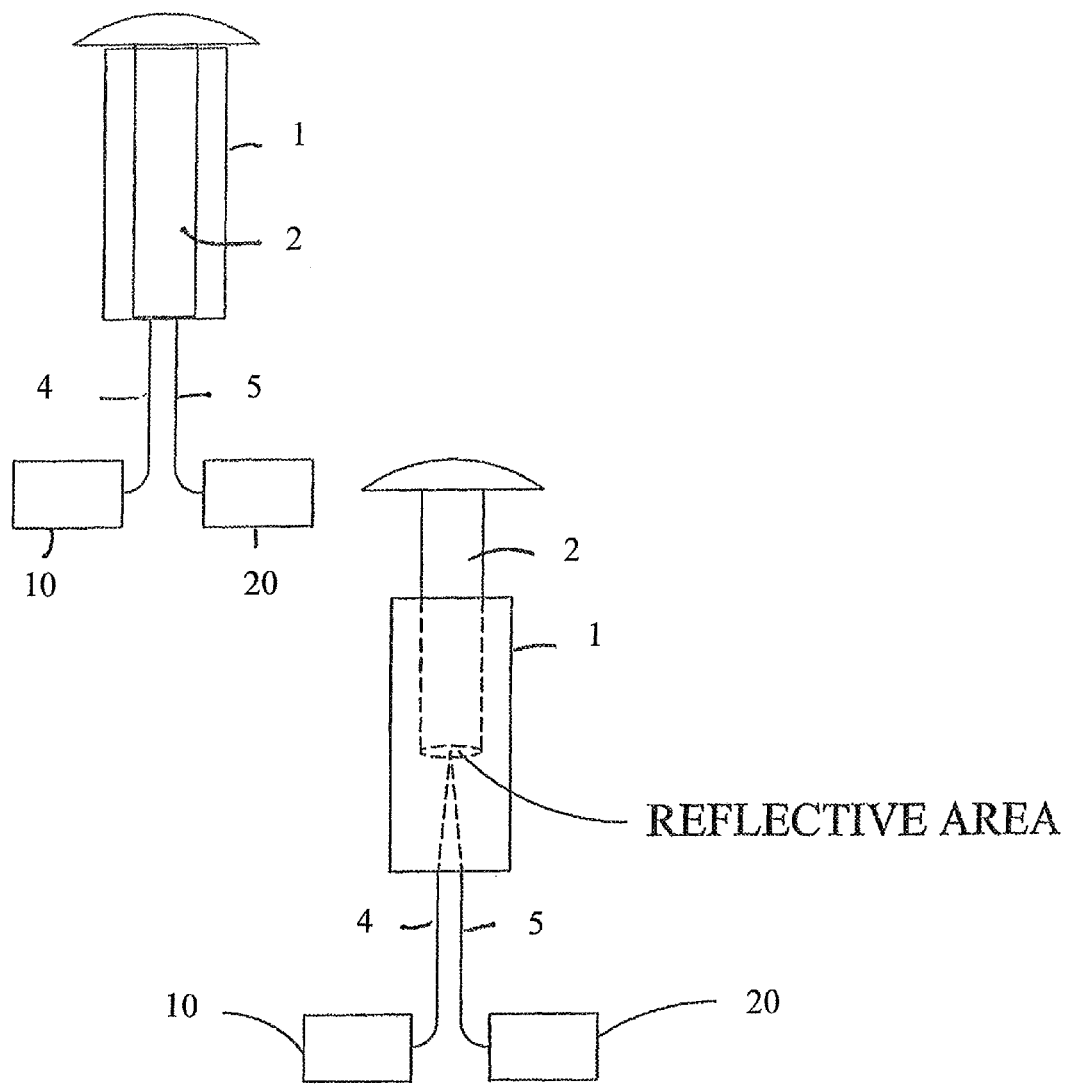
FIG. 8B is a cartoon depiction of a push button switch using the optical activator.

While the switch activator of the present invention may be used in a hazardous environment, such as a pump vault or a wastewater treatment chamber, the invention should not be so restricted and may be deployed in any environment. One embodiment discussed in detail is a wide angle float embodiment containing the optical activator, and a sump pump application. However, the invention can also be used in narrow angle floats in a non-sump pump environment, and indeed, does not have to be deployed in any type of float. The activator could be used in a wall switch, where the moveable means is a slidable arm or pivoting arm, such as shown in FIG. 8A. Any type of common mechanical switch could use the inline activator, such as a push button switch (shown in FIG. 8B), toggle switch, slide switch, reed switch or other mechanically activated or human operated switch. In these embodiments, the housing generally houses the activator (push button, toggle, etc.) and also houses the terminal ends of the light cables. Indeed, a three-position switch, for example a hand-off-auto switch, can be built. For instance, the three position switch re-directs the source light to various receiver fibers (or to no fiber), based on switch position. This can be achieved by using two or more light guides as receiver fibers, where each fiber is connected to separate light detectors, (or to a single detector with the ability to detect different frequency of received lights, for instance, achieved by using different colored light guides or a colored filter over the distal end of the receiver fiber). Four position or more positions switches can also be built using the same principles.

In these mechanically operated or activated switches, (indeed, in any of the optical switches, including float switches) a delay means or friction reducing fluid may not be preferred. Further, in these mechanically operated switches, the light source and light receiver, such as disclosed on the PCT/US2007/70122 application, would generally be located remotely.

While the present invention has been described in connection with a number of embodiments and implementations, the present invention is not so limited but covers various obvious modifications and equivalent arrangements.

The invention claimed is:

1. An optical switch activator comprising an activator body, and a first and second optical fiber each having distal and proximal ends, said optical fiber distal ends coupled to said activator body, said first optical fiber connectable to a light source at said first optical fiber proximal end, and said second optical fiber connectable to a light detector at said second optical fiber proximal end, said optical switch activator further comprising a moveable member, said moveable member moveable along a path between a first position and a second position with respect to said distal ends of said optical fibers, where said path between said first position and said second position is not substantially perpendicular to both axes defined by said first optical fiber's distal end and said second optical fiber's distal end, where said path intersects each of said axes, whereby in said first position, an optical path is present between said distal ends of said first and second optical fibers when light is transmitted through said first optical fiber, and in said second position, an optical path is not present between said distal ends of said first and second optical fibers when light is transmitted through said first optical fiber, and said activator body further comprises in part a glowable material, where reflection or re-emission of light from said glowable material is used in establishing said first position of optical alignment; and wherein said activator body has an axis of light orientation, said axis of light orientation being defined by an axis extending through said distal end of one of said first optical fiber or second optical fiber, and wherein moveable member path is not completely inline with said axis of light orientation.

2. The optical switch activator of claim 1 wherein said moveable member is a fluid.

3. The optical switch activator of claim 1 wherein said glowable material glows as a result of reflection or re-emission of light from said glowable material.

4. The optical switch activator of claim 3 wherein said second position comprises a position along said path where said moveable member is adjacent to one of said first or second optical fiber distal ends.

5. The optical switch activator of claim 1 wherein said moveable member path comprises a curved path that has one end terminating near said distal end of one of said first or second optical fibers.

6. An optical switch activator comprising an activator body, and a first and second optical fiber each having distal and proximal ends, said optical fiber distal ends coupled to said activator body, said first optical fiber connectable to a light source at said first optical fiber proximal end, and said second optical fiber connectable to a light detector at said second optical fiber proximal end, said optical switch activator further comprising a moveable member, said moveable member moveable along a path between a first position and a second position with respect to said distal ends of said optical fibers, where said path between said first position and said second position is not substantially perpendicular to both axes defined by said first optical fiber's distal end and said second optical fiber's distal end, where said path intersects each of said axes, whereby in said first position, an optical path is present between said distal ends of said first and second optical fibers when light is transmitted through said first optical fiber, and in said second position, an optical path is not present between said distal ends of said first and second optical fibers when light is transmitted through said first optical fiber, and said activator body further comprises in part a glowable material, where reflection or re-emission of light from said glowable material is used in establishing said first position of optical alignment; and said optical switch further comprises an exterior housing, said exterior housing being moveable, said activator body coupled to said exterior housing so that said activator body moves in response to movement of said exterior housing, said moveable member moving between said first position and said second position in response to movement of said exterior housing.

7. The optical switch activator of claim 6 wherein said activator body is floatable in a desired fluid.

8. The optical switch activator of claim 6 wherein said moveable member is a portion of said activator body.

9. The optical switch activator of claim 6 wherein said glowable material glows as a result of reflection or re-emission of light from said glowable material.

10. The optical switch activator of claim 9 wherein said second position comprises said movable member being adjacent to one of said first or second optical fiber distal ends.

11. The optical switch activator of claim 6 wherein said activator body has an axis of light orientation, said axis of light orientation being defined by an axis extending through said distal end of one of said first or second optical fibers, and wherein moveable member path is substantially in line with said axis of light orientation.

12. The optical switch activator of claim 6 wherein said distal ends of said first and second optical fibers are orientated in a side-by-side configuration.

13. The optical switch activator of claim 6 further having a means to delay movement of said moveable member.

14. The optical activator of claim 6 wherein said first and second optical fibers are orientated nearly parallel to one another at the distal ends.

15. An optical switch activator comprising an activator body, and a first and second optical fiber each having distal and proximal ends, said optical fiber distal ends coupled to said activator body, said first optical fiber connectable to a light source at said first optical fiber proximal end, and said second optical fiber connectable to a light detector at said second optical fiber proximal end, said optical switch activator further comprising a moveable member, said moveable member moveable along a path between a first position and a second position with respect to said distal ends of said optical fibers, where said path between said first position and said second position is not substantially perpendicular to both axes defined by said first optical fiber's distal end and said second optical fiber's distal end where said path intersects each of said axes, whereby in said first position, an optical path is present between said distal ends of said first and second optical fibers when light is transmitted through said first optical fiber, and in said second position, an optical path is not present between said distal ends of said first and second optical fibers when light is transmitted through said first optical fiber, and said moveable member further comprises in part a glowable material, where reflection or re-emission of light from said glowable material is used in establishing said first position of optical alignment; and said activator body having a portion that is movable, and said moveable member moving between said first position and said second position in response to movement of said movable activator body portion and where said first and second optical fibers bend between said distal and proximal ends in response to movement of said movable activator body portion.

16. The optical activator of claim 15 when said activator body is floatable.

17. The optical activator of claim 15 wherein moveable member comprises a portion of said activator body.

18. The optical activator of claim 15 wherein said first and second optical fibers are orientated nearly parallel to one another at the distal ends.

19. The optical switch activator of claim 15 wherein said glowable material glows as a result of reflection or re-emission of light from said glowable material.

20. An optical switch activator comprising an activator body, and a first and second optical fiber each having distal and proximal ends, said optical fiber distal ends coupled to said activator body, said first optical fiber connectable to a light source at said first optical fiber proximal end, and said second optical fiber connectable to a light detector at said second optical fiber proximal end, said optical switch activator further comprising a moveable activator body, said movable activator body moveable along a path between a first position and a second position with respect to said distal ends of said optical fibers, where said path between said first position and said second position is not substantially perpendicular to both axes defined by said first optical fiber's distal end and said second optical fiber's distal end where said path intersects each of said axes, whereby in said first position, an optical path is present between said distal ends of said first and second optical fibers when light is transmitted through said first optical fiber, and in said second position, an optical path is not present between said distal ends of said first and second optical fibers when light is transmitted through said first optical fiber, and said activator body further comprises in part a glowable material, where reflection or re-emission of light from said glowable material is used in establishing said first position of optical alignment and a moveable member moving between said first position and said second position in response to movement of said movable activator body.

21. The optical activator of claim 20 wherein said first and second optical fibers are orientated nearly parallel to one another at the distal ends.

* * * * *